(12) United States Patent
Ichikawa

(10) Patent No.: US 11,095,167 B2
(45) Date of Patent: Aug. 17, 2021

(54) POWER TRANSMISSION DEVICE

(71) Applicant: MAXELL, LTD., Kyoto (JP)

(72) Inventor: Katsuei Ichikawa, Tokyo (JP)

(73) Assignee: MAXELL, LTD., Kyoto (JP)

( * ) Notice: Subject to any disclaimer, the term of this patent is extended or adjusted under 35 U.S.C. 154(b) by 230 days.

(21) Appl. No.: 16/332,686

(22) PCT Filed: Mar. 7, 2017

(86) PCT No.: PCT/JP2017/008927
§ 371 (c)(1),
(2) Date: Mar. 12, 2019

(87) PCT Pub. No.: WO2018/051546
PCT Pub. Date: Mar. 22, 2018

(65) Prior Publication Data
US 2021/0006098 A1  Jan. 7, 2021

(30) Foreign Application Priority Data

Sep. 13, 2016 (JP) .............................. JP2016-178602

(51) Int. Cl.
*H02J 50/70* (2016.01)
*H02J 50/12* (2016.01)
*H01F 27/28* (2006.01)
*H01F 38/14* (2006.01)
*H02J 7/02* (2016.01)
*B60L 53/12* (2019.01)

(52) U.S. Cl.
CPC .............. *H02J 50/70* (2016.02); *H01F 27/28* (2013.01); *H01F 38/14* (2013.01); *H02J 7/02* (2013.01); *H02J 50/12* (2016.02); *B60L 53/12* (2019.02)

(58) Field of Classification Search
None
See application file for complete search history.

(56) References Cited

U.S. PATENT DOCUMENTS

2002/0158306 A1  10/2002  Niitsu
2009/0015197 A1   1/2009  Sogabe et al.
(Continued)

FOREIGN PATENT DOCUMENTS

JP  2002-353050 A  12/2002
JP  2007-282477 A  10/2007
(Continued)

OTHER PUBLICATIONS

Japanese Notice of Reasons for Refusal issued in corresponding Japanese Patent Application No. 2016-178602, dated Mar. 3, 2020, with English translation.
International Search Report issued in corresponding International Patent Application No. PCT/JP2017/008927, dated May 16, 2017, with English Translation.

*Primary Examiner* — Jared Fureman
*Assistant Examiner* — Joel Barnett
(74) *Attorney, Agent, or Firm* — McDermott Will & Emery LLP

(57) ABSTRACT

Generation of magnetic field leakage is suppressed. A coil of a power transmission device is provided so as to face a metal plate having a slot and a slit connected to the slot and is formed so that its inner peripheral portion is located on an outer side than the slot. A first capacitive element is connected to one end of the coil and a second capacitive element is connected to the other end of the coil.

7 Claims, 19 Drawing Sheets

(56) References Cited

U.S. PATENT DOCUMENTS

| | | |
|---|---|---|
| 2010/0156344 A1 | 6/2010 | Inoue et al. |
| 2011/0127843 A1* | 6/2011 | Karaoguz .............. H02J 7/025 307/104 |
| 2012/0176282 A1 | 7/2012 | Kato et al. |
| 2012/0262357 A1 | 10/2012 | Kato et al. |
| 2013/0038136 A1 | 2/2013 | Wheatley et al. |
| 2014/0008974 A1* | 1/2014 | Miyamoto .......... H01F 27/2871 307/11 |
| 2014/0154980 A1 | 6/2014 | Jang et al. |
| 2014/0175899 A1* | 6/2014 | Miyashita .............. H02J 50/12 307/104 |
| 2014/0232335 A1 | 8/2014 | Tabata et al. |
| 2015/0207223 A1 | 7/2015 | Nakano |
| 2015/0244064 A1* | 8/2015 | Murayama .............. H01Q 1/52 343/702 |
| 2017/0033435 A1 | 2/2017 | Nakano |
| 2017/0170689 A1* | 6/2017 | Jeong ................. H04B 5/0037 |
| 2018/0205255 A1* | 7/2018 | Ikefuji ................. H02J 7/025 |

FOREIGN PATENT DOCUMENTS

| | | |
|---|---|---|
| JP | 2009-022126 A | 1/2009 |
| JP | 2009-254031 A | 10/2009 |
| JP | 2011-097657 A | 5/2011 |
| JP | 2011-176914 A | 9/2011 |
| JP | 2012-039674 A | 2/2012 |
| JP | 2012-105360 A | 5/2012 |
| JP | 2012-169633 A | 9/2012 |
| JP | 2012-198490 A | 10/2012 |
| JP | 2014-117150 A | 6/2014 |
| JP | 2014-514901 A | 6/2014 |
| WO | 2014/125917 A1 | 8/2014 |
| WO | 2015/022859 A1 | 2/2015 |
| WO | 2015/098462 A1 | 7/2015 |
| WO | 2015/163295 A1 | 10/2015 |

* cited by examiner (A)

(B)

POWER TRANSMISSION DEVICE

CROSS REFERENCE TO RELATED APPLICATIONS

This application is the U.S. National Phase under 35 U.S.C. § 371 of International Application No. PCT/P2017/008927, filed on Mar. 7, 2017, which claims the benefits of Japanese Application No. 2016-178602, filed on Sep. 13, 2016, the entire contents of which are hereby incorporated by reference.

TECHNICAL FIELD

The present invention relates to a power transmission device. The present invention claims priority from Japanese Patent Application No. 2016-178602 filed on Sep. 13, 2016, the content of which is hereby incorporated by reference into this application in the designated countries in which incorporation by reference of document is acknowledged.

BACKGROUND ART

Patent Document 1 discloses "an antenna device used in a near field communication (NFC) system and the like and a communication equipment including the same".

Patent Document 2 discloses "a device for improving efficiency and power output of a power transfer circuit that drives a variable load".

RELATED ART DOCUMENTS

Patent Documents

Patent Document 1: WO2015/163295
Patent Document 2: Japanese Patent Application Laid-Open Publication No. 2014-514901

SUMMARY OF THE INVENTION

Problems to be Solved by the Invention

Mobile devices such as smartphones have been reduced in thickness for the reduction in weight and others. Since the mobile device whose thickness has been reduced becomes vulnerable to external shock, strength thereof is secured by disposing a metal plate in a casing of the mobile device or using metal for the casing as described in, for example, Patent Document 1.

In mobile devices such as smartphones, for example, contactless charging (wireless power transfer) is desired. However, if power transmission by magnetic field coupling is performed in the mobile device having a metal plate, there is a problem that a current induced by a change in magnetic flux flows to the surface of the metal plate and the magnetic field leakage becomes large.

Note that, in the power transmission using the series resonance of a coil and a capacitor connected to one end of the coil described in Patent Document 2, a current induced by a change in magnetic field flows to the surface of the metal plate, and the large magnetic field leakage is generated.

Therefore, an object of the present invention is to provide a technique for performing power transmission in which generation of magnetic field leakage is suppressed.

Means for Solving the Problems

This application includes a plurality of means for solving at least apart of the problem described above, and an example thereof is as follows. For solving the problem described above, a power transmission device according to an embodiment of the present invention includes: a coil which is provided so as to face a conductor plate having an aperture and a slit connected to the aperture and is formed so that its inner peripheral portion is located on an outer side than the aperture; a first capacitive element connected to one end of the coil; and a second capacitive element connected to the other end of the coil.

Effects of the Invention

According to the present invention, it is possible to perform the power transmission in which generation of magnetic field leakage is suppressed. Problems, configurations and effects other than those described above become apparent by the following descriptions of the embodiments.

BRIEF DESCRIPTIONS OF THE DRAWINGS

DETAILED DESCRIPTION OF PREFERRED EMBODIMENTS

Hereinafter, embodiments of the present invention will be described with reference to the drawings.

In mobile terminals such as mobile devices, reduction in size and thickness has advanced, but the connector connection at the time of charging is troublesome and the demand for charging by the wireless power transfer has been increasing. Also, in the case of the wired charging for the electric vehicle, water may enter the connector at the time of rain and the contact point may be deteriorated, and thus the charging by the wireless power transfer is desirable. Further, in the case of the wired charging for a stair lift and a mobile lift for nursing care, for example, it is difficult for a care receiver to connect a connector to a device for charging, and thus the charging by the wireless power transfer is desirable.

The wireless power transfer using a radio wave such as a microwave and that using an inductive coupling have been studied. The microwave is excellent in transmission distance, but is poor in transmission efficiency, and is hardly put into practical use. Meanwhile, the wireless power transfer by inductive coupling has a transmission distance as short as about several cm to about 10 and several cm, but the transmission efficiency of the coil used for power transmission and reception as high as about 90% can be obtained. For these reasons, it is considered that transmission by inductive coupling will be the mainstream for the wireless power transfer.

Examples of the power transfer frequency used for the inductive coupling include 100 kHz band, 400 kHz band, 6.78 MHz band, 13.56 MHz band and others. The transmission distance in the wireless power transfer by the inductive coupling is relatively short, but magnetic field leakage is generated from a power transfer coil or a power receiving coil. Considering the influence on other electronic devices and the human body, it is necessary to suppress the magnetic field leakage as low as possible.

First Embodiment

Figure 1:
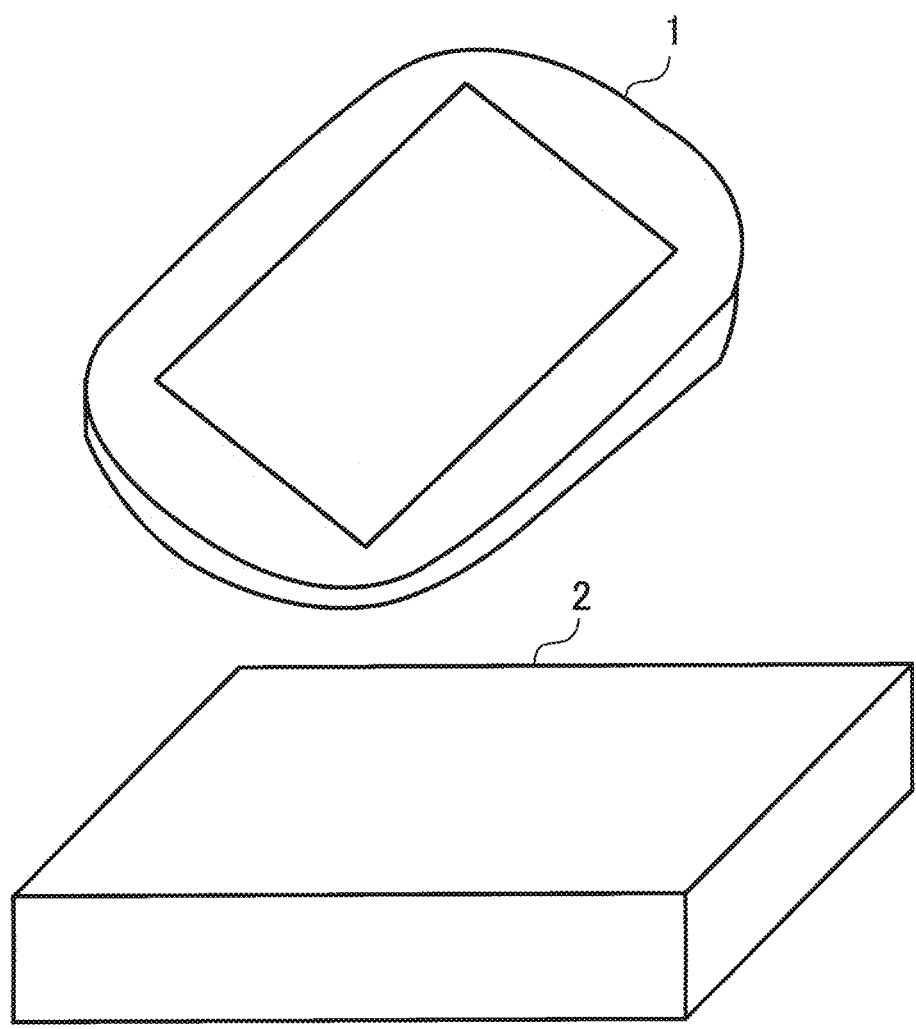
FIG. 1 is a diagram showing an example of a wireless power transfer system to which a power transmission device according to a first embodiment is applied.

FIG. 1 is a diagram showing an example of a wireless power transfer system to which a power transmission device according to a first embodiment is applied. As shown in FIG. 1, the wireless power transfer system includes a mobile device 1 and a charger 2.

The mobile device 1 is, for example, a smartphone, a tablet terminal, a mobile phone or the like. The mobile device 1 has a display on a front side thereof.

The mobile device 1 to which power is charged is placed on the charger 2. The mobile device 1 is charged when a back side thereof (surface on a side having no display) is placed on the charger 2.

Figure 2:
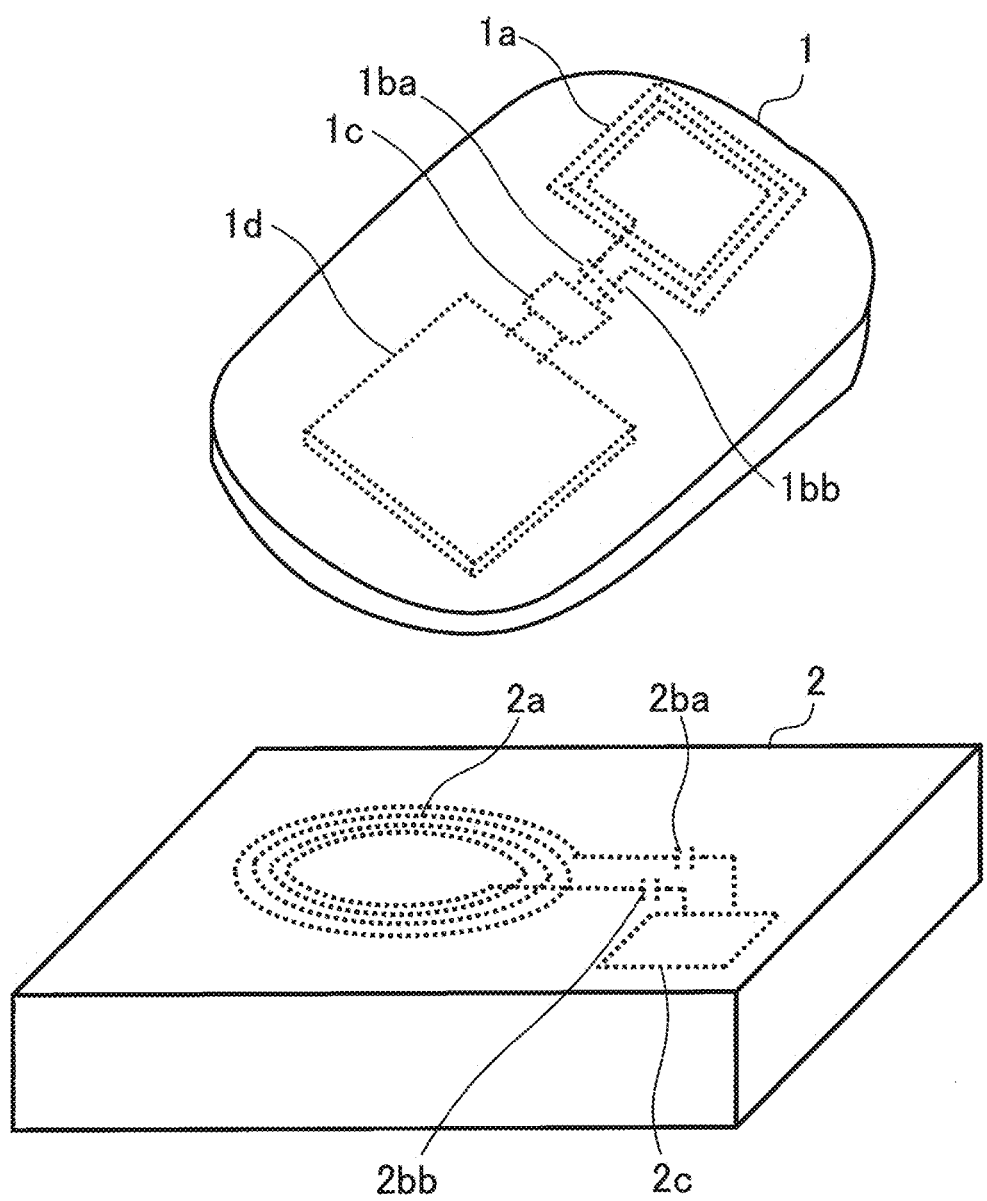
FIG. 2 is a partial perspective view showing an inside of a mobile device and a charger of FIG. 1.

FIG. 2 is a partial perspective view showing an inside of the mobile device 1 and the charger 2 of FIG. 1. In FIG. 2, the same characters as those in FIG. 1 are assigned to the same components as those in FIG. 1. FIG. 2 shows a perspective view from the back side of the mobile device 1 of FIG. 1 (in a state in which the mobile device 1 of FIG. 1 is turned over).

As indicated by dotted lines in FIG. 2, the mobile device 1 includes a coil 1a, capacitors 1ba and 1bb, a power receiving circuit 1c and a battery 1d on a back side thereof. Though described later, a metal plate is provided between the coil 1a and a casing on the back side of the mobile device 1.

As indicated by dotted lines in FIG. 2, the charger 2 includes a coil 2a, capacitors 2ba and 2bb and a power transfer circuit 2c on a side where the mobile device 1 is placed.

Figure 3:
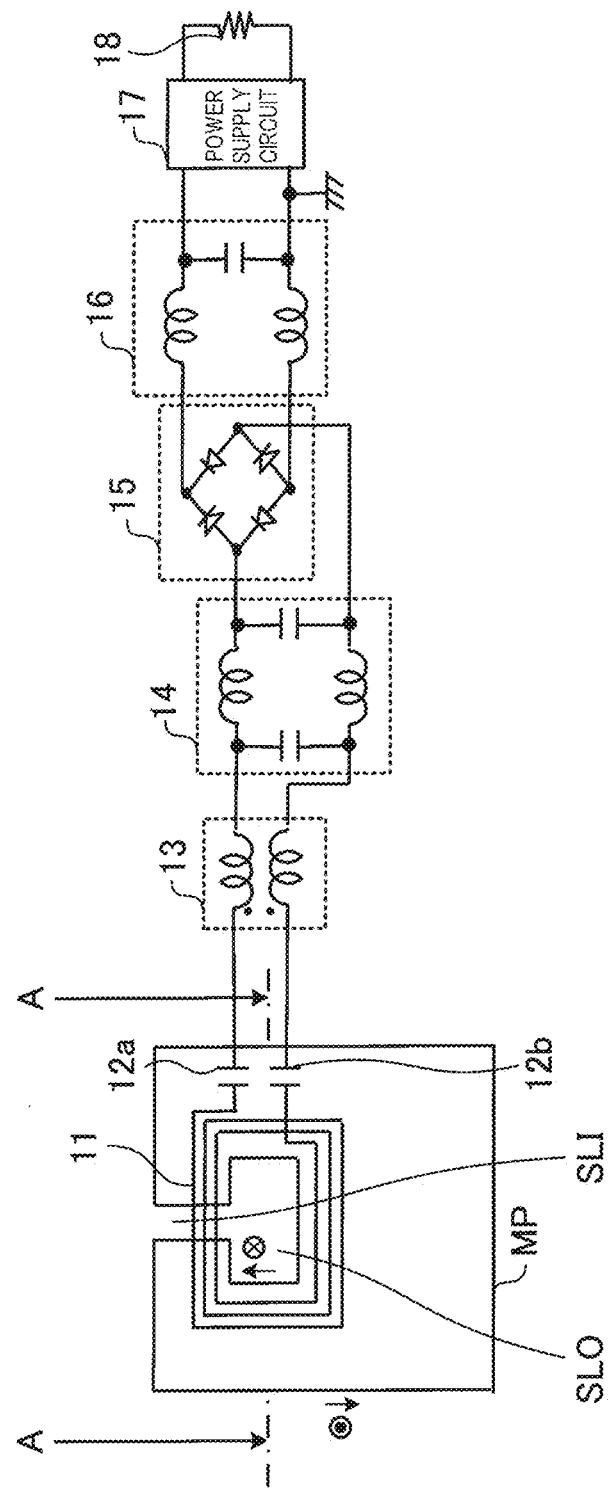
FIG. 3 is a diagram showing a power transmission device.

FIG. 3 is a diagram showing the power transmission device. As shown in FIG. 3, the power transmission device includes a coil 11, capacitors 12a and 12b, a balun trans 13, a low pass filter (LPF) 14, a rectifier circuit 15, a smoothing circuit 16, a power supply circuit 17 and a load 18.

For example, the power transmission device shown in FIG. 3 is incorporated in the mobile device 1 shown in FIG. 2 and receives power transmitted from the charger 2. The coil 11 corresponds to, for example, the coil 1a shown in FIG. 2, and the capacitors 12a and 12b correspond to, for example, the capacitors 1ba and 1bb shown in FIG. 2. The balun trans 13, the LPF 14, the rectifier circuit 15, the smoothing circuit 16 and the power supply circuit 17 correspond to, for example, the power receiving circuit 1c shown in FIG. 2. The load 18 corresponds to, for example, the battery 1d shown in FIG. 2 and electronic circuits that exert various functions of the mobile device 1.

FIG. 3 shows a metal plate MP provided in the mobile device 1. As shown in FIG. 3, the metal plate MP has a slot (aperture) SLO and a slit SLI connected to the slot SLO. Namely, the slot SLO is not closed and has a thin cutout (slit SLI). In a portion of the slot SLO, for example, an image pickup device such as a charge coupled device (CCD) is disposed. Note that, though a shape of the slot SLO is rectangular in the example of FIG. 3, it may be circular or the like.

The coil 11 is formed so that its inner peripheral portion is located on an outer side than the slot SLO of the metal plate MP. In other words, the coil 11 is formed so that its inner peripheral portion surrounds an edge of the slot SLO of the metal plate MP.

Though a shape of the coil 11 is rectangular in the example of FIG. 3, it may be circular. The coil 11 may have any shape without being limited to a rectangular shape or a circular shape as long as it is formed to be symmetrical (including substantially symmetrical, the same applies hereinafter) when viewed from both ends of the coil 11.

The capacitors 12a and 12b are connected between the coil 11 and the balun trans 13. Capacitance values of the capacitors 12a and 12b are the values that resonate with the coil 11 at the power transfer frequency.

One end of the capacitor 12a is connected to one end of the coil 11. The other end of the capacitor 12a is connected to the balun trans 13.

One end of the capacitor 12b is connected to the other end of the coil 11. The other end of the capacitor 12b is connected to the balun trans 13.

The coil 11 and the capacitors 12a and 12b are formed so as to be symmetrical in terms of circuit when viewed from the other ends of the capacitors 12a and 12b (when viewed from the balun trans 13). For example, the capacitors 12a and 12b having the same (including substantially the same, the same applies hereinafter) capacitance value are connected in series to both ends of the coil 11, and the coil 11 and the capacitors 12a and 12b are symmetrical in terms of circuit around the coil 11.

As described above, the coil 11 and the capacitors 12a and 12b are formed so as to be symmetrical in terms of circuit when viewed from the balun trans 13. Accordingly, the power transmission device can suppress the generation of the magnetic field leakage. For example, though described later, the common mode harmonic generated by the rectifier circuit 15 may be re-radiated in the coil 11 in some cases.

Since the coil 11 and the capacitors 12a and 12b are formed to be symmetrical in terms of circuit, the harmonic is canceled, and it is possible to suppress the magnetic field leakage of re-radiation generated from the coil 11. Hereinafter, the coil 11 and the capacitors 12a and 12b are referred to as a resonant circuit in some cases.

A magnetic sheet (not shown in FIG. 3) is provided between the coil 11 and the metal plate MP. For example, a shape of the magnetic sheet is rectangular having an aperture larger than the slot SLO. In other words, the magnetic sheet has a shape extending along a wire rod of the coil 11.

Figure 4:
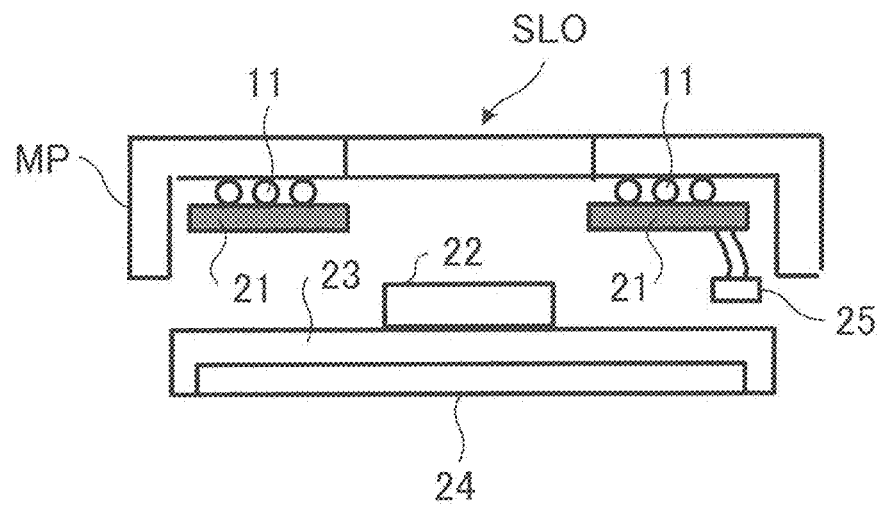
FIG. 4 is a diagram viewed along arrows A of FIG. 3.

FIG. 4 is a diagram viewed along arrows A of FIG. 3. In FIG. 4, the same characters as those in FIG. 3 are assigned to the same components as those in FIG. 3. Note that FIG. 4 also shows a partial cross section of the mobile device 1. For example, FIG. 4 also shows a cross section of a main body 23 and a display 24 of the mobile device 1 before assembly. The main body 23 is embedded in the metal plate MP at the time of assembly, so that the mobile device 1 can secure a predetermined strength even if it has a reduced thickness.

As shown in FIG. 4, the coil 11 is provided so as to face the metal plate MP. The coil 11 is provided between the metal plate MP and a magnetic sheet 21. The magnetic sheet 21 suppresses the influence of the magnetic flux on a power receiving circuit 22 and the main body 23.

The capacitors 12a and 12b (not shown in FIG. 4) are connected to both ends of the coil 11. Both ends of the capacitors 12a and 12b are connected to a connector 25, and the connection of this connector 25 to the main body 23 allows the coil 11 to be connected to the power receiving circuit 22 through the capacitors 12a and 12b. Note that the power receiving circuit 22 corresponds to the balun trans 13, the LPF 14, the rectifier circuit 15, the smoothing circuit 16 and the power supply circuit 17 shown in FIG. 3.

The description returns to FIG. 3. The balun trans 13 includes two transformers. The two transformers are wound on a material of toroidal core or the like so that the polarity becomes the same. The balun trans 13 converts the balanced output power from the coil 11 into unbalanced power.

The LPF 14 includes two coils and two capacitors. The LPF 14 matches the balun trans 13 with the rectifier circuit 15 and suppresses the harmonic that flows back from the rectifier circuit 15 to the coil 11.

The rectifier circuit 15 is a bridge circuit having four diodes. The rectifier circuit 15 rectifies power (voltage) output from the LPF 14.

The power supply circuit 17 converts the voltage output from the rectifier circuit 15 into a predetermined voltage and outputs it to the load 18. The load 18 is, for example, the battery of the mobile device 1 and electronic circuits that exert various functions of the mobile device 1.

It is assumed that the magnetic flux output from the charger 2 is interlinked from a front side of the page of FIG. 3 to a back side of the page of FIG. 3 in the slot SLO of the metal plate MP. In this case, current flows clockwise in an inner end face (end face of the slot SLO) of the metal plate MP, and current flows counterclockwise on an outer end face of the metal plate MP. Since the magnetic flux turning around the outside of the metal plate MP passes from the slot SLO by the current flowing through the end face of the metal plate MP, the coil 11 and the coil of the charger 2 (power transfer coil) can be inductively coupled.

The power received by the coil 11 is output to the rectifier circuit 15 through the balun trans 13 and the LPF 14. The power rectified by the rectifier circuit 15 is smoothed by the smoothing circuit 16 and is output to the load 18 through the power supply circuit 17.

The harmonic is generated in the rectifier circuit 15 and is output to the smoothing circuit 16 and the LPF 14. The smoothing circuit 16 suppresses the harmonic generated in the rectifier circuit 15 and outputs it to the power supply circuit 17. The LPF 14 suppresses the harmonic generated in the rectifier circuit 15 from flowing back to the coil 11.

The common mode harmonic that is not suppressed by the LPF 14 is suppressed by the function of a common mode filter provided in the balun trans 13. Accordingly, the harmonic that is re-radiated from the coil 11 is suppressed.

In addition, the capacitors 12a and 12b and the coil 11 are formed so as to be symmetrical in terms of circuit when viewed from the balun trans 13. Therefore, the harmonic that is re-radiated from the coil 11 is suppressed also by the coil 11 and the capacitors 12a and 12b.

In addition, since the capacitors 12a and 12b and the coil 11 are symmetrical in terms of circuit, matching with the balun trans 13 can be achieved. Accordingly, the power transmission device can also reduce the matching loss.

With this configuration, the power transmission device can reduce the re-radiation of the harmonic generated in the rectifier circuit 15. In addition, the power transmission device can reduce the transmission loss between the power transfer coil (coil of the charger 2) and the power receiving coil (coil 11 of the mobile device 1).

Hereinafter, the leakage level and the measured value of the transmission characteristics of the power transmission device in FIG. 3 will be described. As measurement conditions, the frequency of the transmitted power is 13.56 MHz. Also, the size of the power transfer coil is 5 cm×3 cm, and the number of turns is six turns.

The size and the number of turns of the coil 11 in FIG. 3 which is a power receiving coil are the same as those of the power transfer coil. Also, the size of the metal plate MP in FIG. 3 is 15 cm×10 cm. In addition, the size of the slot is 4 cm×2 cm, and the width of the slit is 1 mm.

Figure 5:
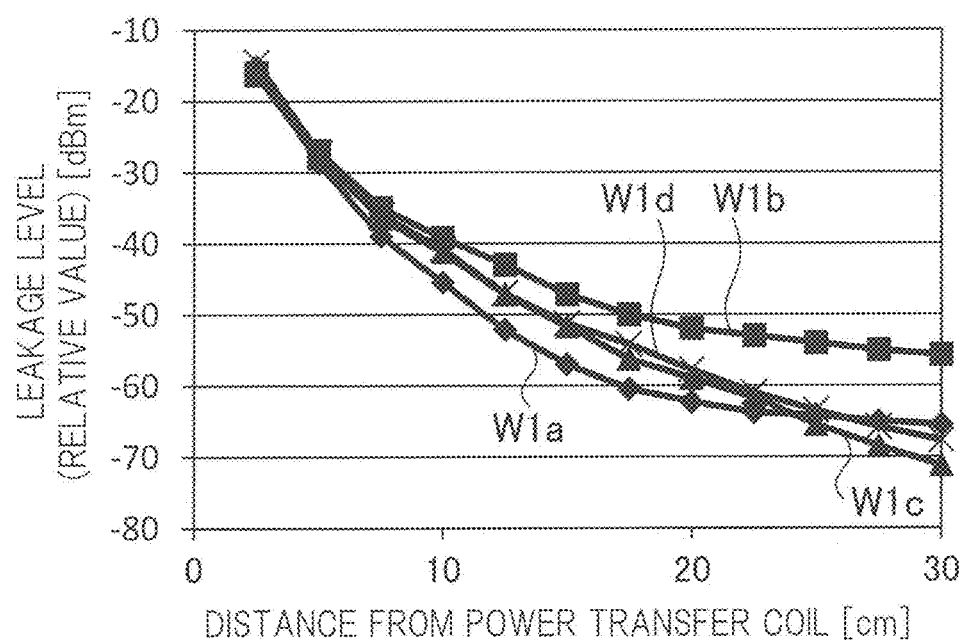
FIG. 5 is a diagram showing a relationship between a distance from a power transfer coil and a leakage level.

FIG. 5 is a diagram showing a relationship between a distance from the power transfer coil and the leakage level. The horizontal axis of FIG. 5 represents the distance between the power transfer coil and the power receiving coil. The vertical axis represents the leakage level in the case of the fundamental wave (13.56 MHz).

A waveform W1a shown in FIG. 5 indicates the leakage level of the fundamental wave when the metal plate MP and the balun trans 13 of the power transmission device in FIG. 3 are omitted (coil 11 only).

A waveform W1b indicates the leakage level of the fundamental wave when the metal plate MP of the power transmission device in FIG. 3 is not omitted and the balun trans 13 is omitted.

A waveform W1c indicates the leakage level of the fundamental wave when the balun trans 13 of the power transmission device in FIG. 3 is omitted and the metal plate MP is connected to the ground.

A waveform W1d indicates the leakage level of the fundamental wave in the power transmission device in FIG. 3.

As indicated by the waveforms W1a and W1b, in the case in which the metal plate MP is present (waveform W1b), the leakage level becomes higher when compared with the case in which the metal plate MP is not present (waveform W1a in the case of the coil 11 only). For example, in the power transmission device, when the distance between the power transfer coil and the coil 11 is 30 cm, the leakage level becomes higher by 10 dB or more.

Even if the metal plate MP is provided, the leakage level becomes lower when the metal plate MP is connected to the ground. For example, the leakage level becomes lower as indicated by the waveform W1*c*.

Even if the metal plate MP is not connected to the ground, the leakage level becomes lower as indicated by the waveform W1*d* when the coil 11 and the capacitors 12*a* and 12*b* are formed so as to be symmetrical in terms of circuit and the balun trans 13 is connected.

Namely, even if the metal plate MP is not connected to the ground, the power transmission device in FIG. 3 can achieve the leakage level equal to that of the case in which the metal plate MP is connected to the ground. This is because the leakage level of the re-radiated fundamental wave is suppressed by the symmetrical structure of the coil 11 and the capacitors 12*a* and 12*b* and the balun trans 13. Namely, in the power transmission device in FIG. 3, an electromagnetic field that is coupled from a parasitic capacitance between the coil 11 and the metal plate MP and leaks to the metal plate is suppressed.

Figure 6:
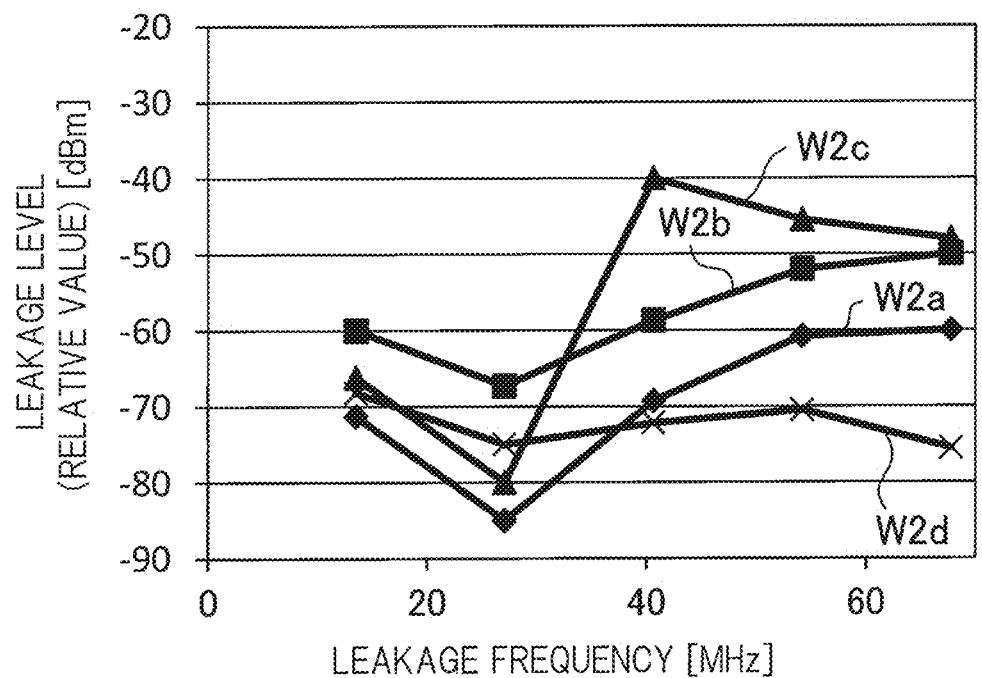
FIG. 6 is a diagram showing a relationship between a leakage frequency and a leakage level.

FIG. 6 is a diagram showing a relationship between the leakage frequency and the leakage level. The horizontal axis of FIG. 6 represents the frequency of leakage power leaking from the power transmission device. The vertical axis represents the leakage level.

A waveform W2*a* shown in FIG. 6 indicates the leakage level when the metal plate MP and the balun trans 13 of the power transmission device in FIG. 3 are omitted (coil 11 only).

A waveform W2*b* indicates the leakage level when the metal plate MP of the power transmission device in FIG. 3 is not omitted and the balun trans 13 is omitted.

A waveform W2*c* indicates the leakage level when the balun trans 13 of the power transmission device in FIG. 3 is omitted and the metal plate MP is connected to the ground.

A waveform W2*d* indicates the leakage level in the power transmission device in FIG. 3.

As indicated by the waveforms W2*a* and W2*b*, in the case in which the metal plate MP is present (waveform W2*b*), the leakage level becomes higher when compared with the case in which the metal plate MP is not present (waveform W2*a* in the case of the coil 11 only).

When the metal plate MP is connected to the ground, the leakage level becomes higher as indicated by the waveform W2*c*. In particular, the leakage level of the third harmonic becomes higher.

Even if the metal plate MP is not connected to the ground, the leakage level becomes lower as indicated by the waveform W2*d* when the coil 11 and the capacitors 12*a* and 12*b* are formed so as to be symmetrical in terms of circuit and the balun trans 13 is connected. In the waveform W2*d*, the leakage level of each of the third harmonic, the fourth harmonic and the fifth harmonic becomes lowest with respect to the other waveforms W2*a* to W2*c*.

Namely, the power transmission device suppresses the common mode of the harmonic current by the symmetrical structure of the coil 11 and the capacitors 12*a* and 12*b* and the balun trans 13.

Here, a comparative power transmission device will be described for the comparison with the power transmission device in FIG. 3.

Figure 7:
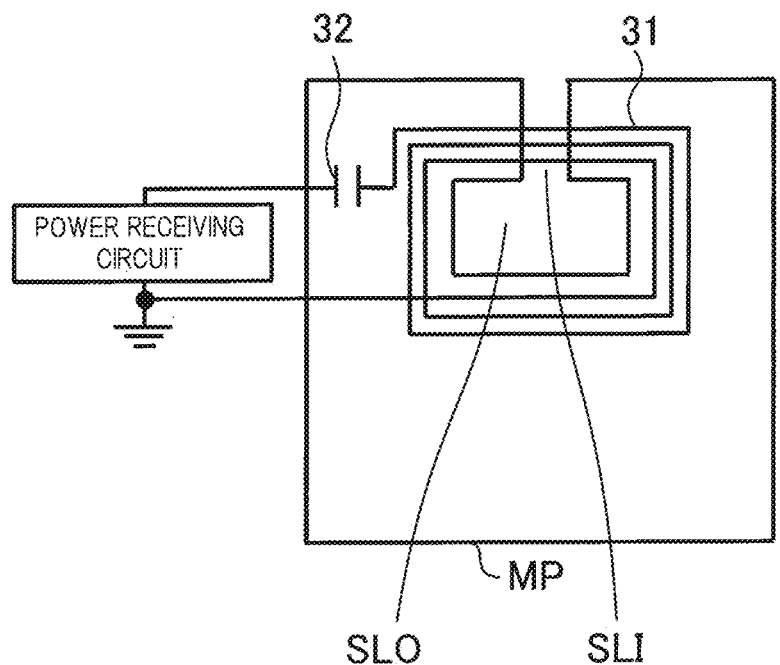
FIG. 7 is a diagram showing a configuration example of a comparative power transmission device.

FIG. 7 is a diagram showing a configuration example of the comparative power transmission device. As shown in FIG. 7, the comparative power transmission device includes a coil 31 and a capacitor 32. Also, FIG. 7 shows a metal plate MP having a slot SLO and a slit SLI.

The comparative power transmission device is different from the power transmission device in FIG. 3 in that the coil 31 and the capacitor 32 are formed so as to be asymmetrical when viewed from the power receiving circuit. It is assumed that the size and the number of turns of the coil 31 are the same as those of the coil 11 in FIG. 3. Also, it is assumed that the metal plate MP in FIG. 7 has the same shape as that of the metal plate MP in FIG. 3. In the following description, the coil 31 and the capacitor 32 are referred to as a resonant circuit in some cases.

Figure 8:
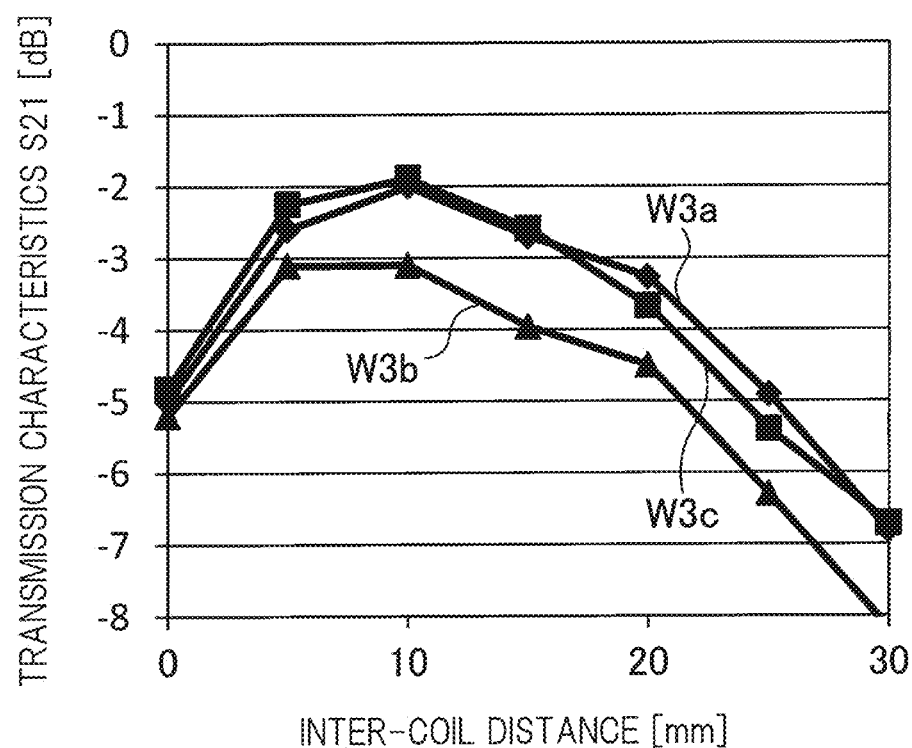
FIG. 8 is a diagram showing a relationship between an inter-coil distance and transmission characteristics.

FIG. 8 is a diagram showing a relationship between an inter-coil distance and transmission characteristics. The horizontal axis of FIG. 8 represents the inter-coil distance and the vertical axis represents the transmission characteristics S21.

A waveform W3*a* shown in FIG. 8 indicates the comparative power transmission device shown in FIG. 7 and indicates the transmission characteristics when the power receiving circuit does not include a balun trans.

A waveform W3*b* indicates the comparative power transmission device shown in FIG. 7 and indicates the transmission characteristics when the power receiving circuit includes a balun trans.

A waveform W3*c* indicates the transmission characteristics of the power transmission device shown in FIG. 3.

As indicated by the waveforms W3*a* and W3*b*, in the case in which the resonant circuit in FIG. 7 has an asymmetrical structure, the power transmission characteristics are deteriorated when the power receiving circuit includes the balun trans. For example, there is a difference of about 1 dB in the transmission characteristics between the comparative power transmission device having the balun trans and the comparative power transmission device having no balun trans.

Meanwhile, in the case in which the resonant circuit in FIG. 3 has the symmetrical structure, the power transmission characteristics are not deteriorated as indicated by the waveform W3*c* even when the power receiving circuit includes the balun trans.

Here, the reason why the transmission efficiency is lowered when the balun trans is connected to the resonant circuit having an asymmetrical structure will be described.

Figure 9:
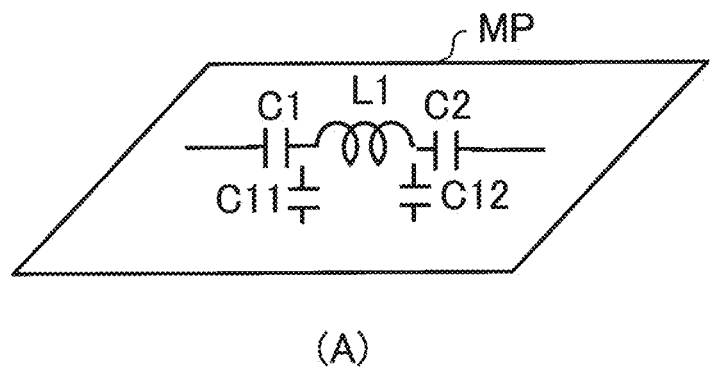
FIG. 9 is a diagram showing an equivalent circuit of each of the power transmission device in FIG. 3 and the comparative power transmission device in FIG. 7.
Figure 9:
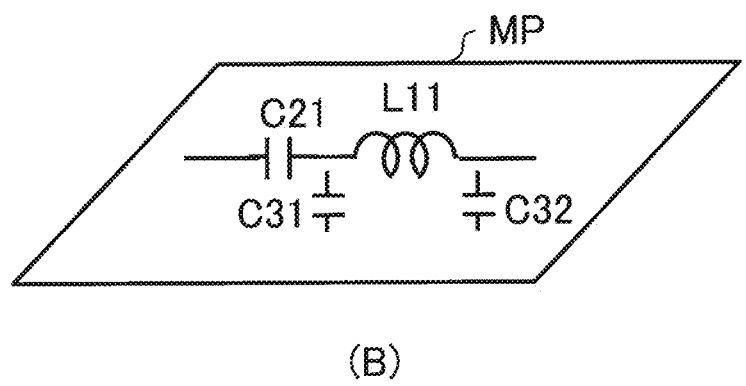

FIG. 9 is a diagram showing an equivalent circuit of each of the power transmission device in FIG. 3 and the comparative power transmission device in FIG. 7. FIG. 9(A) shows the equivalent circuit of the power transmission device in FIG. 3 and FIG. 9(B) shows the equivalent circuit of the comparative power transmission device in FIG. 7.

An inductor L1 shown in FIG. 9(A) corresponds to the coil 11 in FIG. 3. Capacitors C1 and C2 correspond to the capacitors 12*a* and 12*b* in FIG. 3. Capacitors C11 and C12 indicate parasitic capacitances generated between the coil 11 and the metal plate MP.

An inductor L11 shown in FIG. 9(B) corresponds to the coil 31 in FIG. 7. A capacitor C21 corresponds to the capacitor 32 in FIG. 7. Capacitors C31 and C32 indicate parasitic capacitances generated between the coil 31 and the metal plate MP.

In the comparative power transmission device shown in FIG. 7, a series resonance is formed by the coil 31 and the capacitor 32. Therefore, a voltage having a value obtained by multiplying the applied voltage by the selectivity of the coil is generated between a connection point of the coil 31 and the capacitor 32.

This voltage is very high and a voltage of about 100 times the applied voltage is generated under certain conditions.

Therefore, the harmonic current flowing through the capacitors C31 and C32 indicating the parasitic capacitances is larger in the capacitor C31 than in the capacitor C32. Further, since the resonant circuit has an asymmetrical structure in the comparative power transmission device in FIG. 7, the electric field distribution at both ends of the inductor L11 (coil 31) and the current by the parasitic capacitance become unbalanced. When the balun trans is connected to such a resonant circuit in which the current is unbalanced, mismatch occurs due to the unbalance characteristics between the balanced signal of the balun trans and both terminals of the resonant circuit. As a result, the transmission efficiency is lowered in the comparative power transmission device in FIG. 7.

On the other hand, in the power transmission device in FIG. 3, the capacitors 12a and 12b (capacitors C1 and C2) are divided into two and are connected to both ends of the coil 11 (inductor L1) as shown in FIG. 9 (A). Therefore, the voltage at both ends of the coil 11 becomes ½ with respect to FIG. 9 (B). In addition, the resonant circuit of the power transmission device in FIG. 3 is symmetrical and is balanced with the balun trans 13. Namely, the power transmission device in FIG. 3 can achieve the matching between the resonant circuit and the balun trans 13. As a result, the power transmission device in FIG. 3 can suppress the reduction in transmission efficiency.

Figure 10:
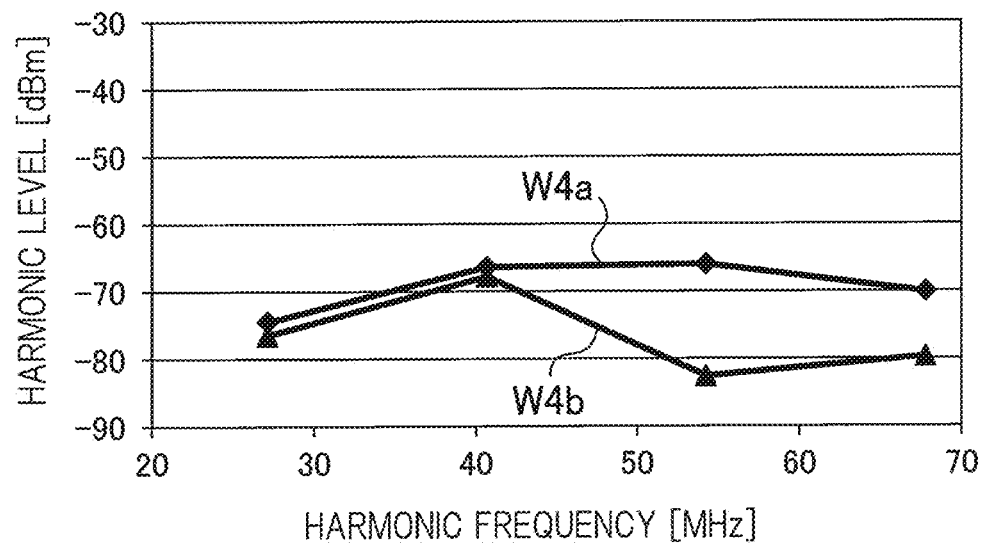
FIG. 10 is a diagram showing a relationship between a harmonic frequency and a harmonic level.

FIG. 10 is a diagram showing a relationship between a harmonic frequency and a harmonic level. The horizontal axis of FIG. 10 represents the harmonic frequency (including the fundamental wave) of leakage power leaking from the power transmission device when the metal plate MP and the balun trans 13 of the power transmission device in FIG. 3 are omitted. The vertical axis represents the harmonic level at the position away from the power receiving coil by 10 cm.

A waveform W4a shown in FIG. 10 indicates the harmonic level when the two coils of the smoothing circuit 16 of the power transmission device in FIG. 3 in which the metal plate MP and the balun trans 13 are omitted are omitted (short-circuited).

A waveform W4b shown in FIG. 10 indicates the harmonic level when the two coils of the smoothing circuit 16 of the power transmission device in FIG. 3 in which the metal plate MP and the balun trans 13 are omitted are not omitted.

As indicated by the waveforms W4a and W4b, when the smoothing circuit 16 includes two coils, the effect of suppressing the fourth and fifth harmonics can be achieved.

Figure 11:
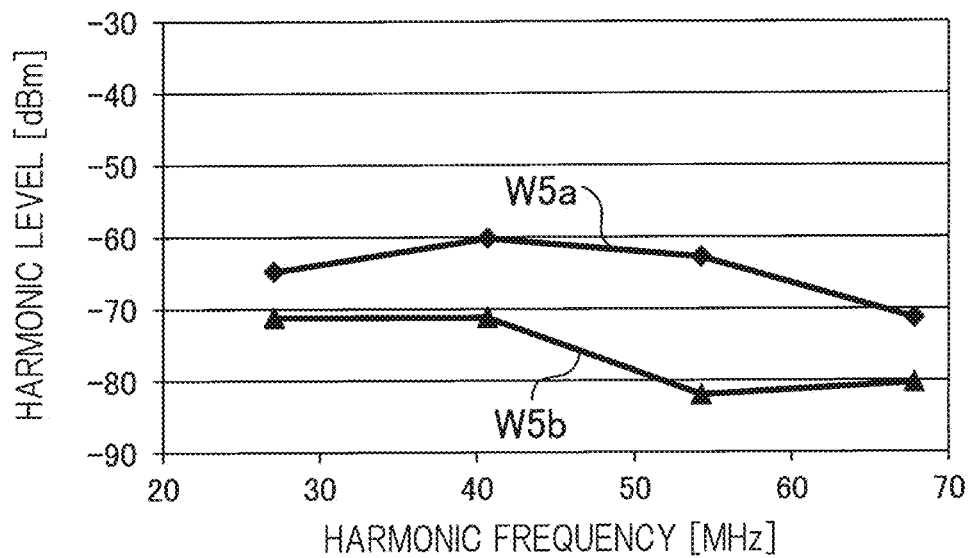
FIG. 11 is a diagram showing a relationship between a harmonic frequency and a harmonic level.

FIG. 11 is a diagram showing a relationship between a harmonic frequency and a harmonic level. The horizontal axis of FIG. 11 represents the harmonic frequency (including the fundamental wave) of leakage power leaking from the power transmission device in FIG. 3. The vertical axis represents the harmonic level at the position away from the power receiving coil by 10 cm.

A waveform W5a shown in FIG. 11 indicates the harmonic level when the two coils of the smoothing circuit 16 of the power transmission device in FIG. 3 are omitted (short-circuited).

A waveform W5b shown in FIG. 11 indicates the harmonic level when the two coils of the smoothing circuit 16 of the power transmission device in FIG. 3 are not omitted.

As indicated by the waveforms W5a and W5b, even in the case where the metal plate MP is present, the harmonic level is lowered overall by providing the balun trans 13, and the effect of suppressing the harmonic equivalent to the case in which the metal plate MP is not present (waveforms W4a and W4b in FIG. 10) can be achieved.

As described above, the coil 11 of the power transmission device is provided so as to face the metal plate MP having the slot SLO and the slit SLI connected to the slot SLO, and is formed so that its inner peripheral portion is located on an outer side than the slot SLO. Further, the capacitor 12a is connected to one end of the coil 11 and the capacitor 12b is connected to the other end of the coil 11. Accordingly, the power transmission device can suppress the magnetic field leakage.

In addition, the coil 11 and the capacitors 12a and 12b are formed so as to be symmetrical in terms of circuit when viewed from the terminal of the capacitor 12a that is not connected to one end of the coil 11 and the terminal of the capacitor 12b that is not connected to the other end of the coil 11. Accordingly, the power transmission device can suppress the magnetic field leakage.

In addition, the balun trans 13 is connected to the terminal of the capacitor 12a that is not connected to one end of the coil 11 and the terminal of the capacitor 12b that is not connected to the other end of the coil 11. Accordingly, the power transmission device can suppress the magnetic field leakage. Also, the power transmission device can suppress the reduction in transmission efficiency.

In the STD-T113 that is an ARIB (Association of Radio Industries and Business) standard for the wireless power transfer, there is a system of using 6.78 MHz as the power transfer frequency. In this case, the third harmonic becomes 20.34 MHz and is out of the ISM (Industry Science Medical) band. Therefore, it is important to suppress the harmonic of 20.34 MHz. However, the power transmission device can suppress the magnetic field leakage (including the harmonic) and can suppress also the harmonic (20.34 MHz) that is out of the ISM band.

Note that, in FIG. 2, the mobile device 1 and the charger 2 can communicate with each other by the NFC. For example, the charger 2 periodically transmits power, with which the mobile device 1 can communicate by the NFC, to the mobile device 1, and the mobile device 1 starts the NFC with the received power and transmits its own device information to the charger 2. The charger 2 starts charging when it is determined that the mobile device 1 to be charged is a valid device based on the device information received from the mobile device 1. Further, the charger 2 can perform the charging adapted to the mobile device 1 based on the received device information.

Second Embodiment

In a second embodiment, a capacitor is connected in the middle of the coil 11 shown in the first embodiment.

Figure 12:
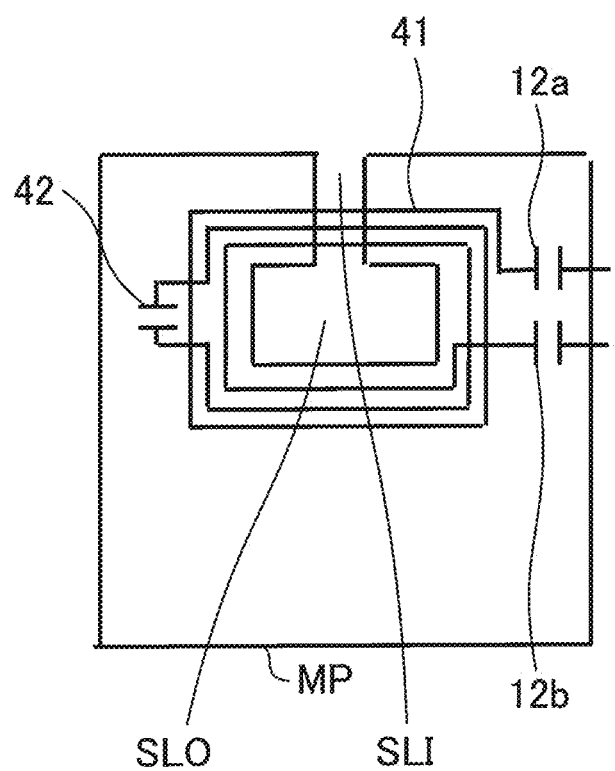
FIG. 12 is a diagram showing an example of a resonant circuit of a power transmission device according to a second embodiment.

FIG. 12 is a diagram showing an example of a resonant circuit of a power transmission device according to the second embodiment. In FIG. 12, the same characters as those in FIG. 3 are assigned to the same components as those in FIG. 3.

FIG. 12 shows the metal plate MP and a resonant circuit. The resonant circuit includes the capacitors 12a and 12b, a coil 41 and a capacitor 42. Note that a rectangular magnetic sheet (not shown) whose central portion is hollowed is disposed between the metal plate MP and the coil 41.

The coil 41 has the same shape as the coil 11 described with reference to FIG. 3. However, as described below, the capacitor 42 is connected in the middle of the coil 41.

The capacitor 42 is connected at an intermediate point between one end and the other end of the coil 41. A combined capacitance value of the capacitors 12a, 12b and 42 is a value that resonates with the coil 11 at the power transfer frequency. However, it is assumed that the capacitance values of the capacitors 12a and 12b are the same capacitance value.

From the foregoing, the resonant circuit shown in FIG. 12 is symmetrical in terms of circuit when viewed from the terminals of the capacitors 12a and 12b that are not connected to the coil 41. Accordingly, the power transmission device can suppress the magnetic field leakage. Also, since the resonant circuit is symmetrical in terms of circuit, matching with the balun trans 13 can be achieved and the reduction in transmission efficiency can be suppressed.

Further, in the resonant circuit in FIG. 12, the voltage at both ends of the coil 41 is lowered by the capacitor 42 compared with the resonant circuit in FIG. 3. Accordingly, the wireless transfer device can reduce the influence due to the parasitic capacitance between the coil 41 and the metal plate MP.

Third Embodiment

In a third embodiment, a power transmission device includes a forced balun trans.

Figure 13:
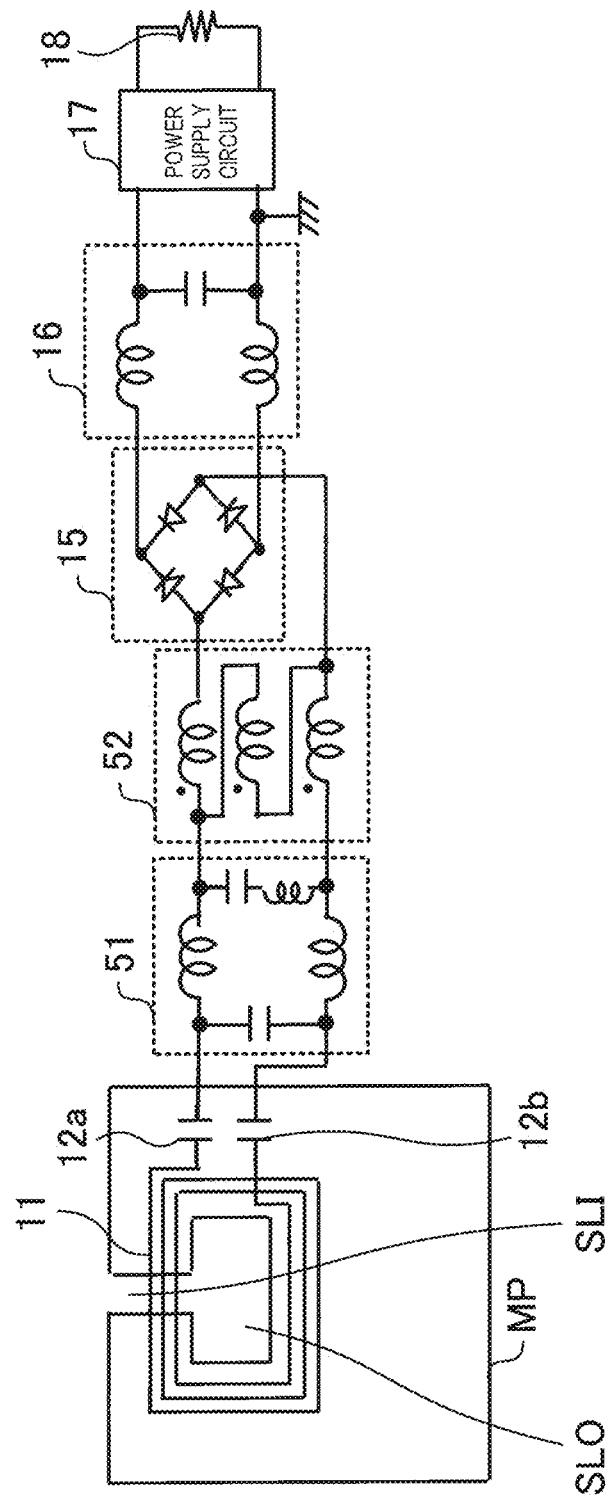
FIG. 13 is a diagram showing a power transmission device according to a third embodiment.

FIG. 13 is a diagram showing the power transmission device according to the third embodiment. In FIG. 13, the same characters as those in FIG. 3 are assigned to the same components as those in FIG. 3. As shown in FIG. 13, the power transmission device includes a LPF 51 and a forced balun trans 52. For example, the power transmission device shown in FIG. 13 is incorporated in the mobile device 1 shown in FIG. 2 and receives power transmitted from the charger 2.

The LPF 51 is connected between the resonant circuit and the forced balun trans 52. The LPF 51 includes two capacitors and three coils. The LPF 51 includes a trap circuit configured of the series resonance of the capacitor and the coil.

The trap circuit is configured to resonate at, for example, 20.34 MHz. Accordingly, the third harmonic (20.34 MHz) generated when the power transfer frequency is 6.78 MHz is suppressed by the trap circuit. Namely, the trap circuit can suppress the harmonic (20.34 MHz) that is out of the ISM band.

The forced balun trans 52 is connected between the LPF 51 and the rectifier circuit 15. The forced balun trans 52 includes three transformers.

A common mode filter effect of the forced balun trans 52 is higher when the transmission line impedance is lower. Therefore, in the power transmission device in FIG. 13, the LPF 51 is connected to a former stage of the forced balun trans 52 so that the signal source impedance of the forced balun trans 52 is lowered. Namely, the LPF 51 also has a function of circuit matching. Of course, when the output impedance of the resonant circuit is low, the forced balun trans 52 may be connected to a latter stage of the resonant circuit. Further, the LPF 51 may be connected to a latter stage of the forced balun trans 52.

The forced balun trans 52 can achieve higher balancing degree than the balun trans 13 (float balun trans) shown in FIG. 3. Accordingly, the power transmission device shown in FIG. 13 can further suppress the magnetic field leakage of the harmonic.

As described above, the power transmission device includes the forced balun trans 52. Accordingly, the power transmission device can suppress the power leakage.

In addition, the LPF 51 includes the trap circuit. Accordingly, the power transmission device can suppress the power leakage of the harmonic. Note that the LPF 14 shown in FIG. 3 may also include the trap circuit.

Fourth Embodiment

In a fourth embodiment, a power transmission device performs the power transmission by utilizing magnetic resonance.

Figure 14:
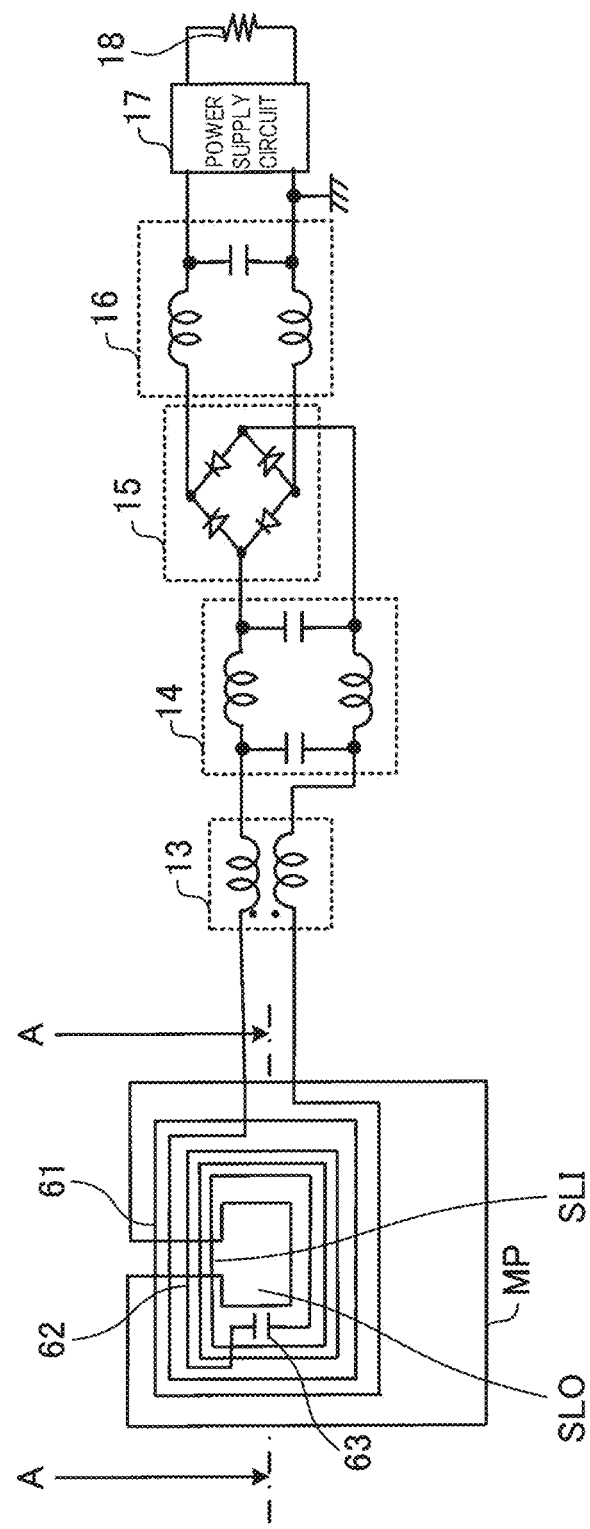
FIG. 14 is a diagram showing a power transmission device according to a fourth embodiment.

FIG. 14 is a diagram showing the power transmission device according to the fourth embodiment. In FIG. 14, the same characters as those in FIG. 3 are assigned to the same components as those in FIG. 3. As shown in FIG. 14, the power transmission device includes coils 61 and 62 and a capacitor 63. For example, the power transmission device shown in FIG. 14 is incorporated in the mobile device 1 shown in FIG. 2 and receives power transmitted from the charger 2.

The coil 61 is formed so that its inner peripheral portion is located on an outer side than the slot SLO of the metal plate MP. In other words, the coil 61 is formed so that its inner peripheral portion surrounds an edge of the slot SLO of the metal plate MP.

The coil 61 is connected to the balun trans 13. The coil 61 is a load side coil. Though a shape of the coil 61 is rectangular in the example of FIG. 14, it may be circular. The coil 61 may have any shape without being limited to a rectangular shape or a circular shape as long as it is formed to be symmetrical when viewed from both ends of the coil 61.

The coil 62 is formed so that its inner peripheral portion is located on an outer side than the slot SLO of the metal plate MP. In other words, the coil 62 is formed so that its inner peripheral portion surrounds an edge of the slot SLO of the metal plate MP.

The coil 62 is a closed coil and the capacitor 63 is connected in series in the middle of the coil 62. The coil 62 is a magnetic resonance coil. Though a shape of the coil 62 is rectangular in the example of FIG. 14, it may be circular. The shape of the coil 62 is desirably the same as that of the coil 61.

The power transmission device shown in FIG. 14 receives power by the magnetic resonance system. The power transmission device can efficiently receive power from the coil 61 which is a load side coil when the power transfer frequency is equal to the resonance frequency determined by the coil 62 and the capacitor 63.

Coupling of the coil 61 to the coil 62 which is the magnetic resonance coil is reduced due to the influence of the metal plate MP. Therefore, the number of turns of the coil 61 is set to two turns or more so that the coupling to the coil 62 becomes strong.

Figure 15:
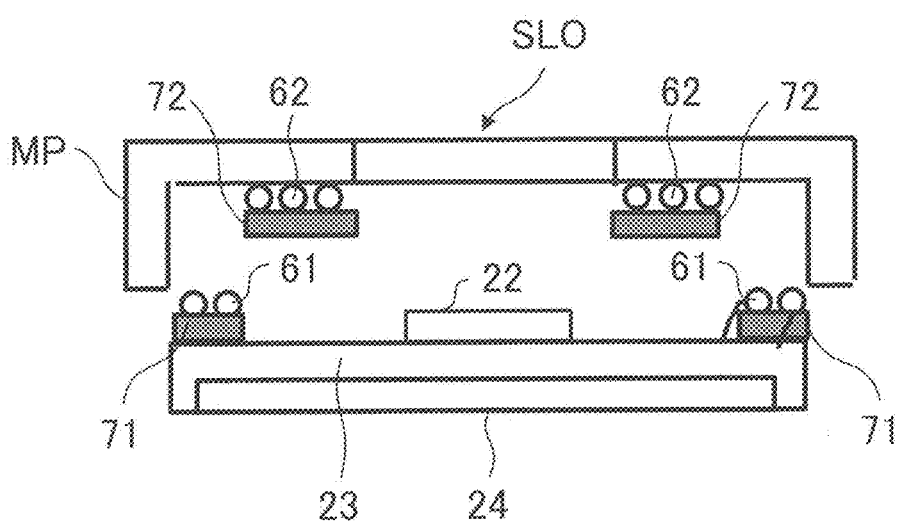
FIG. 15 is a diagram viewed along arrows A of FIG. 14.

FIG. 15 is a diagram viewed along arrows A of FIG. 14. In FIG. 15, the same characters as those in FIG. 14 are assigned to the same components as those in FIG. 14. Note that FIG. 15 also shows a partial cross section of the mobile device 1. For example, FIG. 15 also shows a cross section of the main body 23 and the display 24 of the mobile device 1 before assembly described with reference to FIG. 4. The main body 23 is embedded in the metal plate MP at the time of assembly, so that the mobile device 1 can secure a predetermined strength even if it has a reduced thickness.

As shown in FIG. 15, a magnetic sheet 71 is provided between the coil 61 and the main body 23. The magnetic sheet 71 suppresses the influence of the magnetic flux on the power receiving circuit 22 and the main body 23.

For example, a shape of the magnetic sheet 71 is rectangular having an aperture larger than the slot SLO. In addition, the magnetic sheet 71 has a shape extending along a wire rod of the coil 61.

The wire rod of the coil 61 is connected to the main body 23. The coil 61 is connected to the power receiving circuit 22 through the main body 23. Note that the power receiving circuit 22 corresponds to the balun trans 13, the LPF 14, the rectifier circuit 15, the smoothing circuit 16 and the power supply circuit 17 shown in FIG. 14.

The coil 62 is provided so as to face the metal plate MP. The coil 62 is provided between the metal plate MP and a magnetic sheet 72. The magnetic sheet 72 suppresses the influence of the magnetic flux on the power receiving circuit 22 and the main body 23.

For example, a shape of the magnetic sheet 72 is rectangular having an aperture larger than the slot SLO. In addition, the magnetic sheet 72 has a shape extending along a wire rod of the coil 62.

As described above, the coil 61 of the power transmission device is provided so as to face the metal plate MP having the slot SLO and the slit SLI connected to the slot SLO, and is formed so that its inner peripheral portion is located on an outer side than the slot SLO. Also, the coil 62 is a closed loop coil, is provided so as to face the metal plate, and is formed so that its inner peripheral portion is located on an outer side than the slot SLO. Further, the capacitor 63 is connected in series in (the middle of) the closed loop coil 62. Accordingly, the power transmission device can suppress the magnetic field leakage in spite of the magnetic resonance system.

Also, in the power transmission device, the coupling of the coils 61 and 62 can be strengthened by setting the number of turns of the coil 61 to two turns or more even if the metal plate MP is present.

Fifth Embodiment

A power transmission device on a power transfer side will be described in a fifth embodiment.

Figure 16:
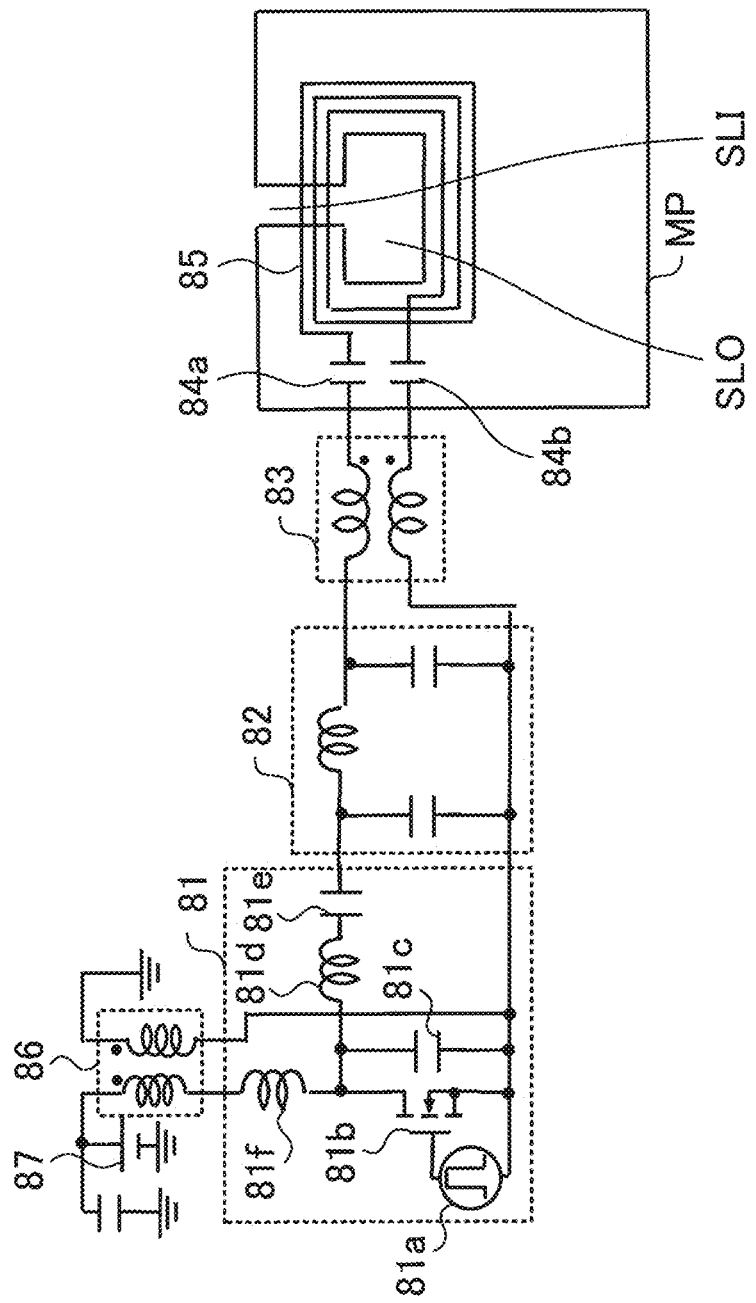
FIG. 16 is a diagram showing a power transmission device according to a fifth embodiment.

FIG. 16 is a diagram showing a power transmission device according to the fifth embodiment. As shown in FIG. 16, the power transmission device includes an E class amplifier 81, a LPF 82, a balun trans 83, capacitors 84a and 84b, a coil 85, a common mode filter 86 and a power supply 87.

For example, the power transmission device shown in FIG. 16 is incorporated in the charger 2 shown in FIG. 2 and transmits power to the mobile device 1. The coil 85 shown in FIG. 16 corresponds to, for example, the coil 2a of the charger 2 shown in FIG. 2, and the capacitors 84a and 84b correspond to, for example, the capacitors 2ba and 2bb shown in FIG. 2. The E class amplifier 81, the LPF 82, the balun trans 83, the common mode filter 86 and the power supply 87 correspond to, for example, the power transfer circuit 2c shown in FIG. 2.

FIG. 16 shows the metal plate MP provided in the charger 2. The metal plate MP has the slot SLO and the slit SLI as in the metal plate MP described with reference to FIG. 3. Note that, when the mobile device 1 shown in FIG. 2 is placed on the charger 2 so as to be charged (placed on the charger 2 so that the display of the mobile device 1 faces upward), the coil 85 and the metal plate MP of the power transmission device in FIG. 16 and the coil 11 and the metal plate MP of the power transmission device in FIG. 3 have such a positional relationship that the coil 85 and the metal plate MP of the power transmission device in FIG. 16 and the metal plate MP and the coil 11 of the power transmission device shown in FIG. 3 are arranged in this order from below.

The E class amplifier 81 includes a driver power supply 81a, a field effect transistor 81b, capacitors 81c and 81e, a coil 81d and a choke coil 81f.

A gate of the field effect transistor 81b is connected to the driver power supply 81a, and a drain thereof is connected to the power supply 87 capable of adjusting voltage through the choke coil 81f and the common mode filter 86. The capacitor 81c is connected between the drain and a source of the field effect transistor 81b. The drain of the field effect transistor 81b is connected to the LPF 82 through the coil 81d and the capacitor 81e.

For example, the choke coil 81f makes a reactance value large enough to be regarded as infinite at the power transfer frequency. Accordingly, the power supply 87 can supply power to the drain of the field effect transistor 81b without any influence on the transmitted power.

When the field effect transistor 81b is in an off state, the capacitors 81c and 81e and the coil 81d constitute a resonant circuit. The resonance frequency of the resonant circuit is defined as "f1". Meanwhile, when the field effect transistor 81b is in an on state, the coil 81d and the capacitor 81e constitute a resonant circuit. The resonance frequency of the resonant circuit is defined as "f2". Values of the capacitors 81c and 81e and the coil 81d are determined so that the relation of "f2<f0<f1" is established when the power transfer frequency is defined as "f0".

Under the conditions described above, when the drive signal of the driver power supply 81a is input to make the field effect transistor 81b perform the switch operation, the power transfer signal (power) is efficiently output from the drain of the field effect transistor 81b. Further, a large resonance current flows through the coil 85 by the resonant circuit configured of the capacitors 84a and 84b and the coil 85, and a strong magnetic field is generated. Accordingly, the power transmission device can transmit the power.

The LPF 82 is connected through the balun trans 83 to the resonant circuit configured of the capacitors 84a and 84b and the coil 85. The LPF 82 passes the power transfer frequency band and suppresses the second and larger harmonics generated in the class E amplifier 81. The LPF 82 is formed of, for example, a n type LPF.

The balun trans 83 includes two transformers. The two transformers are wound on a material of toroidal core or the like so that the polarity becomes the same. The balun trans 83 converts the unbalanced power output from the E class amplifier 81 into balanced power.

The capacitors 84a and 84b and the coil 85 have the same configurations as those of the capacitors 12a and 12b and the coil 11 shown in FIG. 3. Namely, the capacitors 84a and 84b and the coil 85 are formed so as to be symmetrical in terms of circuit when viewed from the balun trans 83. Accordingly, the power transmission device can suppress the generation of the magnetic field leakage. For example, the power output from the E class amplifier 81 includes the common mode harmonic. This harmonic is canceled because the capacitors 84a and 84b and the coil 85 are formed so as to be symmetric in terms of circuit, so that the magnetic field leakage due to the harmonic can be suppressed.

Also, since the resonant circuit is symmetrical in terms of circuit, matching with the balun trans 13 can be achieved. Accordingly, the power transmission device can reduce the matching loss and thus can suppress the reduction in the transmission efficiency.

The common mode filter 86 suppress the noise generated in the E class amplifier 81 from leaking to the power supply 87.

As described above, the coil 85 of the power transmission device is provided so as to face the metal plate MP having the slot SLO and the slit SLI connected to the slot SLO, and is formed so that its inner peripheral portion is located on an outer side than the slot SLO. Further, the capacitor 84*a* is connected to one end of the coil 85 and the capacitor 84*b* is connected to the other end of the coil 85. Accordingly, the power transmission device can suppress the magnetic field leakage.

Further, the coil 85 and the capacitors 84*a* and 84*b* are formed so as to be symmetrical in terms of circuit when viewed from the terminal of the capacitor 84*a* that is not connected to one end of the coil 85 and the terminal of the capacitor 84*b* that is not connected to the other end of the coil 85. Accordingly, the power transmission device can suppress the magnetic field leakage.

Also, the balun trans 83 is connected to the terminal of the capacitor 84*a* that is not connected to one end of the coil 85 and the terminal of the capacitor 84*b* that is not connected to the other end of the coil 85. Accordingly, the power transmission device can suppress the magnetic field leakage. In addition, the power transmission device can suppress the reduction in transmission efficiency.

Further, in the STD-T113 that is an ARIB standard for the wireless power transfer, there is a system of using 6.78 MHz as the power transfer frequency. In this case, the third harmonic becomes 20.34 MHz and is out of the ISM band. Therefore, it is important to suppress the harmonic of 20.34 MHz. However, the power transmission device suppresses the magnetic field leakage (including the harmonic) and thus can suppress the harmonic (20.34 MHz) that is out of the ISM band.

Sixth Embodiment

Another example of a power transmission device on a power transfer side will be described in a sixth embodiment.

Figure 17:
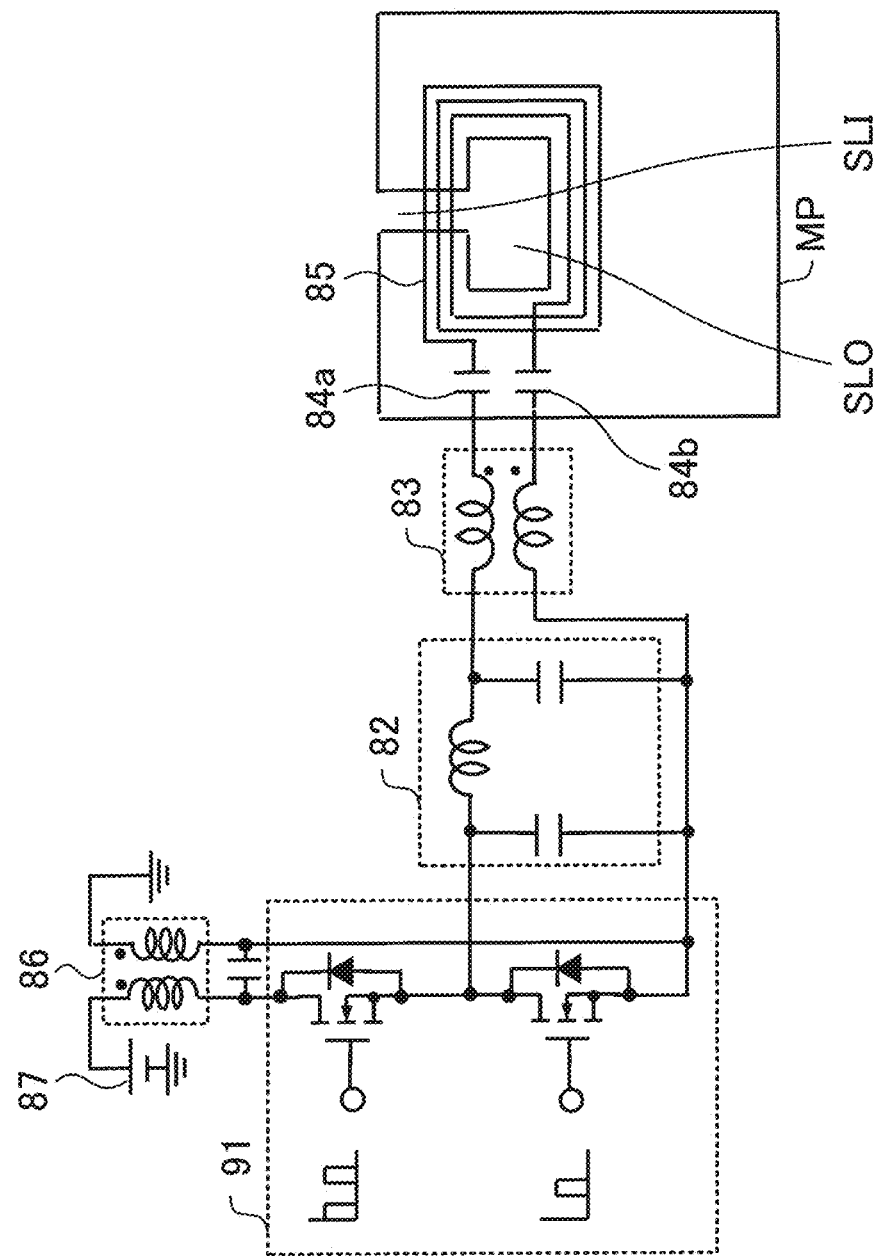
FIG. 17 is a diagram showing a power transmission device according to a sixth embodiment.

FIG. 17 is a diagram showing a power transmission device according to the sixth embodiment. In FIG. 17, the same characters as those in FIG. 16 are assigned to the same components as those in FIG. 16.

As shown in FIG. 17, the power transmission device includes a power transfer amplifier 91. The power transfer amplifier 91 includes two field effect transistors and constitutes an inverter circuit of a half bridge circuit.

Power driving signals of reverse phases are input to the two field effect transistors of the power transfer amplifier 91. The power driving signal has a power transfer frequency of the power to be transmitted. The power transfer amplifier 91 outputs the power to be transmitted to the mobile device 1 to the resonant circuit through the LPF 82 and the balun trans 83.

The power transmission device shown in FIG. 16 is suitable for, for example, the power transmission from several MHz to several tens MHz. On the other hand, the power transmission device shown in FIG. 17 is suitable for, for example, the power transmission of a relatively low frequency such as several hundred KHz.

Seventh Embodiment

In a seventh embodiment, a power transmission device transmits power by utilizing magnetic resonance.

Figure 18:
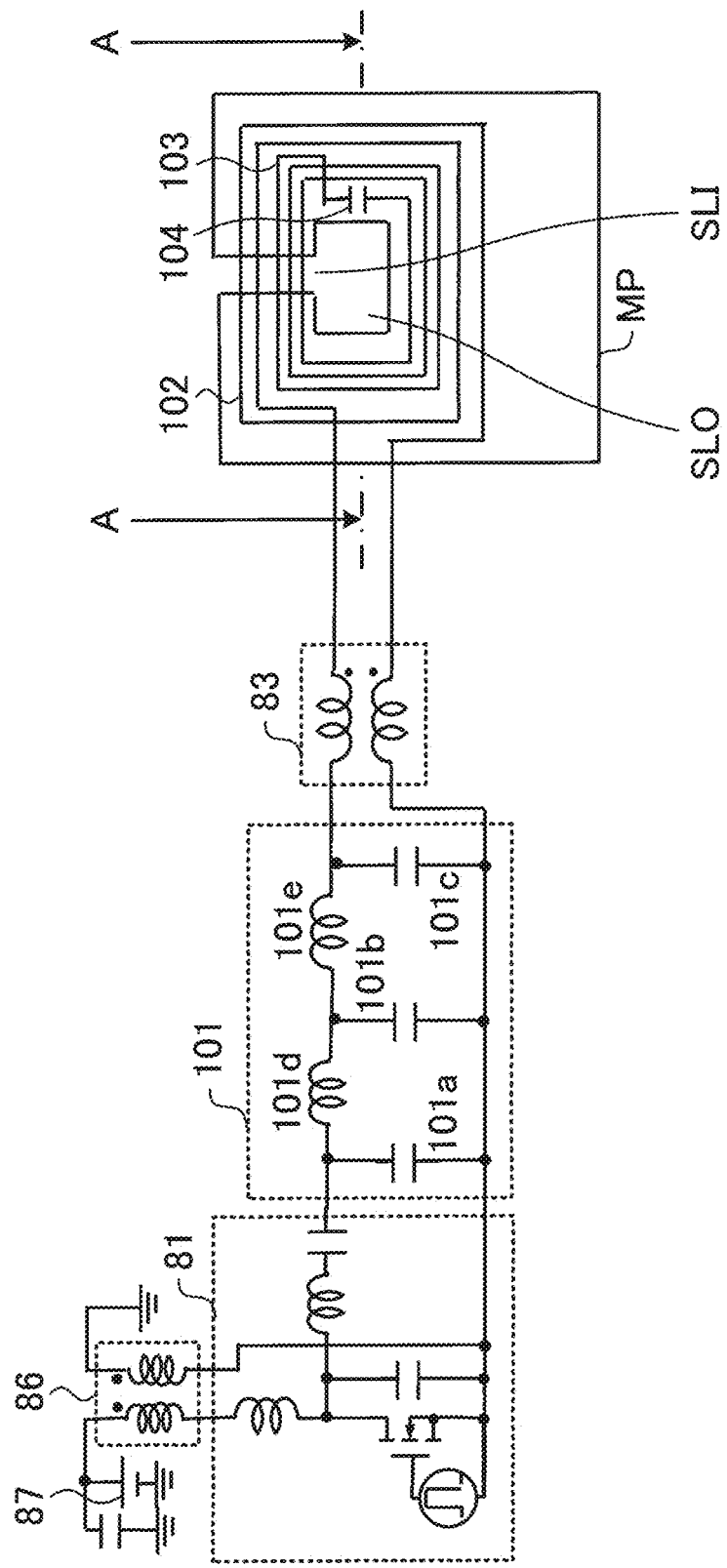
FIG. 18 is a diagram showing a power transmission device according to a seventh embodiment.

FIG. 18 is a diagram showing the power transmission device according to the seventh embodiment. In FIG. 18, the same characters as those in FIG. 16 are assigned to the same components as those in FIG. 16. As shown in FIG. 18, the power transmission device includes a LPF 101, the coils 61 and 62 and the capacitor 63. For example, the power transmission device shown in FIG. 18 is incorporated in the charger 2 shown in FIG. 2 and transmits power to the mobile device 1.

The LPF 101 is connected between the E class amplifier 81 and the balun trans 83. The LPF 101 includes capacitors 101*a*, 101*b* and 101*c* and coils 101*d* and 101*e*, and forms a fifth order LPF.

A coil 102 is formed so that its inner peripheral portion is located on an outer side than the slot SLO of the metal plate MP. In other words, the coil 102 is formed so that its inner peripheral portion surrounds an edge of the slot SLO of the metal plate MP.

The coil 102 is connected to the balun trans 83. The coil 102 is a power transfer coil. Though a shape of the coil 102 is rectangular in the example of FIG. 18, it may be circular. The coil 102 may have any shape without being limited to a rectangular shape or a circular shape as long as it is formed to be symmetrical when viewed from both ends of the coil 102.

A coil 103 is formed so that its inner peripheral portion is located on an outer side than the slot SLO of the metal plate MP. In other words, the coil 103 is formed so that its inner peripheral portion surrounds an edge of the slot SLO of the metal plate MP.

The coil 103 is a closed coil and a capacitor 104 is connected in series in the middle of the coil 103. The coil 103 is a magnetic resonance coil. Though a shape of the coil 103 is rectangular in the example of FIG. 18, it may be circular. The shape of the coil 103 is desirably the same as that of the coil 102.

The power transmission device shown in FIG. 18 transmits power by the magnetic resonance system. The power transmission device can efficiently transmit power of the coil 102 which is a power transfer coil when the power transfer frequency is equal to the resonance frequency determined by the coil 103 and the capacitor 104.

Coupling of the coil 102 to the coil 103 which is the magnetic resonance coil is reduced due to the influence of the metal plate MP. Therefore, the number of turns of the coil 102 is set to two turns or more so that the coupling to the coil 103 becomes strong.

When no load is present on the coil 103 (when the mobile device 1 is not placed on the charger 2), the impedance at both ends of the coil 103 becomes greatly high. At this time, the coil 101*e* and the capacitor 101*c* are at frequencies close to resonance, and thus both ends of the capacitor 101*b* are in a state close to short circuit. Due to the short-circuit state of the both ends of the capacitor 101*b*, the capacitor 101*a* and the coil 101*d* become a parallel resonant circuit, so that the impedance increases and the load of the E class amplifier 81 increases. Accordingly, it is possible to prevent the overcurrent from flowing through the E class amplifier 81 when no load is present on the coil 103.

Figure 19:
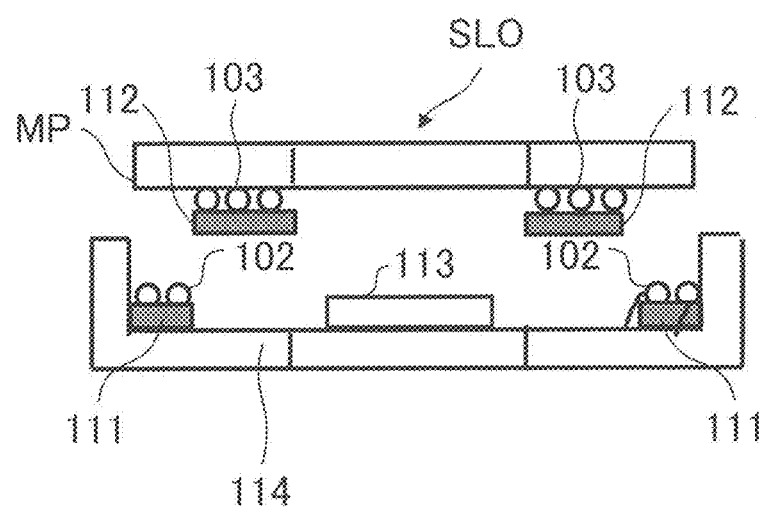
FIG. 19 is a diagram viewed along arrows A of FIG. 18.

FIG. 19 is a diagram viewed along arrows A of FIG. 18. In FIG. 19, the same characters as those in FIG. 18 are assigned to the same components as those in FIG. 18. Note that FIG. 19 also shows a partial cross section of the charger 2. For example, FIG. 19 also shows a cross section of a main body 114 of the charger 2 before assembly. The metal plate MP is embedded in the main body 114 at the time of assembly, so that the charger 2 can secure a predetermined strength even if it has a reduced thickness. Note that the mobile device 1 charged by the charger 2 is placed above the metal plate MP.

As shown in FIG. 19, a magnetic sheet 111 is provided between the coil 102 and the main body 114. The magnetic sheet 111 suppresses the influence of the magnetic flux on a power transfer circuit 113 and the main body 114.

For example, a shape of the magnetic sheet 111 is rectangular having an aperture larger than the slot SLO. In addition, the magnetic sheet 111 has a shape extending along a wire rod of the coil 102.

The wire rod of the coil 102 is connected to the main body 114. The coil 102 is connected to the power transfer circuit 113 through the main body 114. Note that the power transfer circuit 113 corresponds to the E class amplifier 81, the LPF 101, the balun trans 83, the common mode filter 86, the power supply 87 and the like shown in FIG. 18.

The coil 103 is provided so as to face the metal plate MP. The coil 103 is provided between the metal plate MP and a magnetic sheet 112. The magnetic sheet 112 suppresses the influence of the magnetic flux on the power transfer circuit 113 and the main body 114.

The magnetic sheet 112 has a shape extending along a wire rod of the coil 103. For example, a shape of the magnetic sheet 112 is rectangular having an aperture larger than the slot SLO.

As described above, the coil 102 of the power transmission device is provided so as to face the metal plate MP having the slot SLO and the slit SLI connected to the slot SLO, and is formed so that its inner peripheral portion is located on an outer side than the slot SLO. Also, the coil 103 is a closed loop coil, is provided so as to face the metal plate, and is formed so that its inner peripheral portion is located on an outer side than the slot SLO. Further, the capacitor 104 is connected in series in (the middle of) the closed loop coil 103. Accordingly, the power transmission device can suppress the magnetic field leakage in spite of the magnetic resonance system.

Also, in the power transmission device, the coupling of the coils 102 and 103 can be strengthened by setting the number of turns of the coil 102 to two turns or more even if the metal plate MP is present.

Eighth Embodiment

The coupling of the magnetic flux varies depending on an overlapping state of a coil on the power transfer side and a coil on the power receiving side, and the power transfer efficiency also varies. In a power transmission device according to an eighth embodiment, the power transfer efficiency reduced by the overlapping state of the coil on the power transfer side and the coil on the power receiving side is improved.

Figure 20:
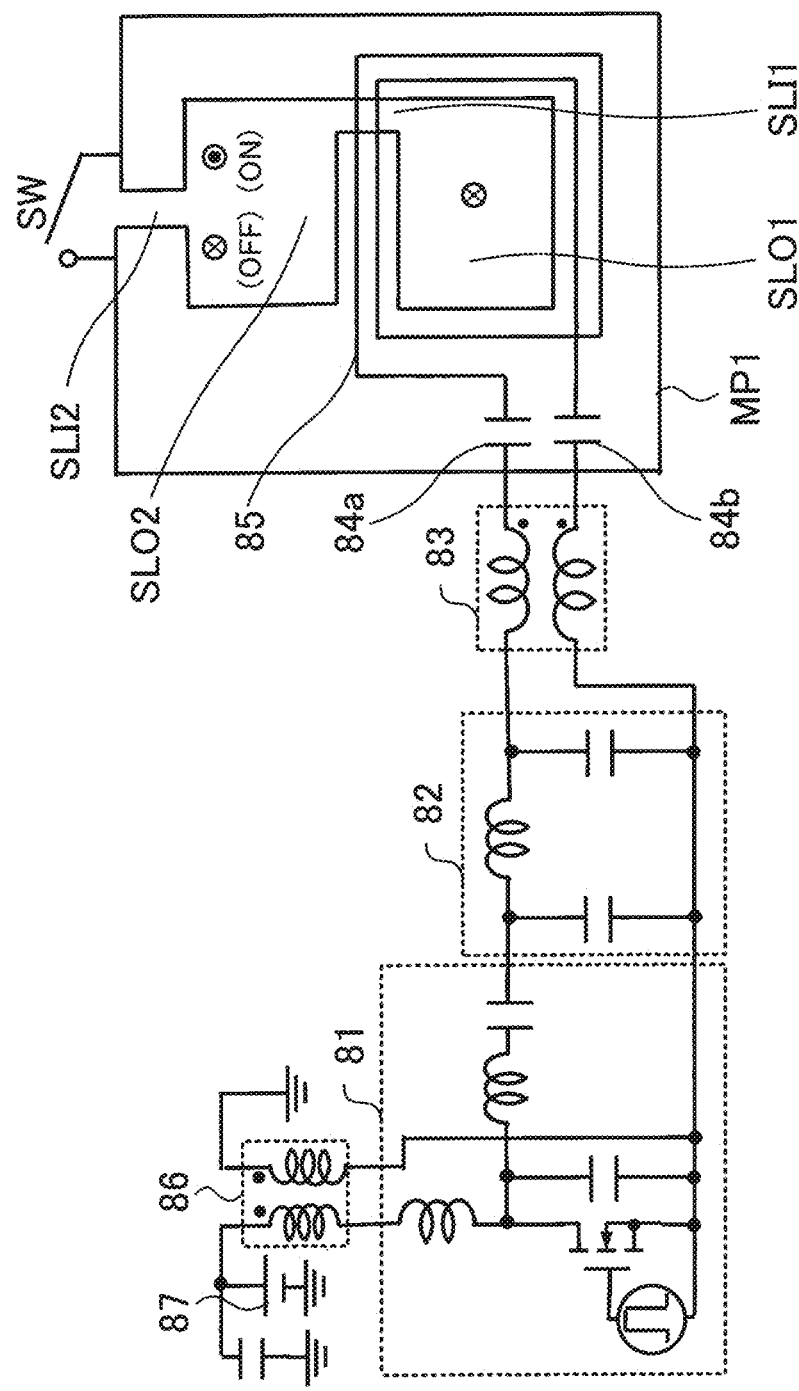
FIG. 20 is a diagram showing a power transmission device according to an eighth embodiment.

FIG. 20 is a diagram showing the power transmission device according to the eighth embodiment. In FIG. 20, the same characters as those in FIG. 16 are assigned to the same components as those in FIG. 16.

The power transmission device in FIG. 20 is different in a metal plate MP1 from the power transmission device in FIG. 16. As shown in FIG. 20, the metal plate MP1 has two slots SLO1 and SLO2. The two slots SLO1 and SLO2 are formed close to each other. In addition, the metal plate MP1 has a slit SLI1 that connects the two slots SLO1 and SLO2 and a slit SLI2 connected to an outer circumference of the metal plate MP1. Further, the metal plate MP1 has a switch SW for short-circuiting and releasing the slit SLI2 at both ends of the slit SLI2.

The coil 85 is provided around the slot SLO1. For example, the coil 85 is formed so that its inner peripheral portion is located on an outer side than the slot SLO1 of the metal plate MP1. In other words, the coil 85 is formed so that its inner peripheral portion surrounds an edge of the slot SLO1 of the metal plate MP1.

When the switch SW is off, the common mode magnetic flux passes through the slot SLO1 and the slot SLO2, and a loop current is formed on the end faces of the metal plate MP1 (the end faces of the slots SLO1 and SLO2 and the outer end face of the metal plate MP1). Accordingly, power can be supplied to the power transmission device on the power receiving side.

On the other hand, when the switch SW is turned on, a loop current flows in the slot SLO1 and the slot SLO2 in a direction hindering the each other's magnetic flux change. In this case, since the current by the counter electromotive force flows through the slot SLO2 without the coil 85 and does not flow through the slot SLO1, the magnetic flux of the coil 85 can pass through the slot SLO2. Thus, the magnetic fluxes of the slots SLO1 and SLO2 are reverse in direction, so that the magnetic flux loop is formed between the slot SLO1 and the slot SLO2. Since the magnetic flux like this is in the direction canceling the each other's magnetic flux of coil, the electromagnetic field leakage level can be lowered. In addition, if the coil on the power receiving side also has the same configuration as that on the power transfer side, it is possible to receive the power.

An example of the control of the switch SW will be described. It is assumed that the charger 2 shown in FIG. 2 conducts the wireless communication with the mobile device 1 by the NFC and receives the magnitude of the received power from the mobile device 1.

First, when the mobile device 1 is placed, the charger 2 turns off the switch SW of the power transmission device shown in FIG. 20, and transmits power to the mobile device 1. Then, the charger 2 receives, from the mobile device 1, the magnitude of the received power at the time when the switch SW is turned off.

Next, the charger 2 turns on the switch SW of the power transmission device shown in FIG. 20, and transmits power to the mobile device 1. Then, the charger 2 receives, from the mobile device 1, the magnitude of the received power at the time when the switch SW is turned on.

Next, the charger 2 compares the magnitude of the received power of the mobile device 1 at the time when the switch SW is turned off with the magnitude of the received power of the mobile device 1 at the time when the switch SW is turned on. Afterward, the charger 2 transmits power in a switch state in which the received power of the mobile device 1 is larger.

Depending on how the mobile device 1 is placed on the charger 2, the overlapping state between the coil on the power transfer side and the coil on the power receiving side varies, and the power transfer efficiency also varies. The power transmission device in FIG. 20 changes the generation state of magnetic flux by switching the switch SW and transmits power in a switch state with good power transfer efficiency.

As described above, the metal plate MP1 has the slot SLO1 and the slot SLO2 connected to the slot SLO1. Also, the slit SLI2 is provided in the slot SLO2, and the coil 85 is formed so that its inner peripheral portion is located on an outer side than the slot SLO1. Further, the power transmission device includes the switch for short-circuiting the slit SLI2. Accordingly, the power transmission device can suppress the magnetic field leakage and can perform power transmission with good power transfer efficiency.

Ninth Embodiment

Powers of different power transmission frequencies are received in a ninth embodiment.

Figure 21:
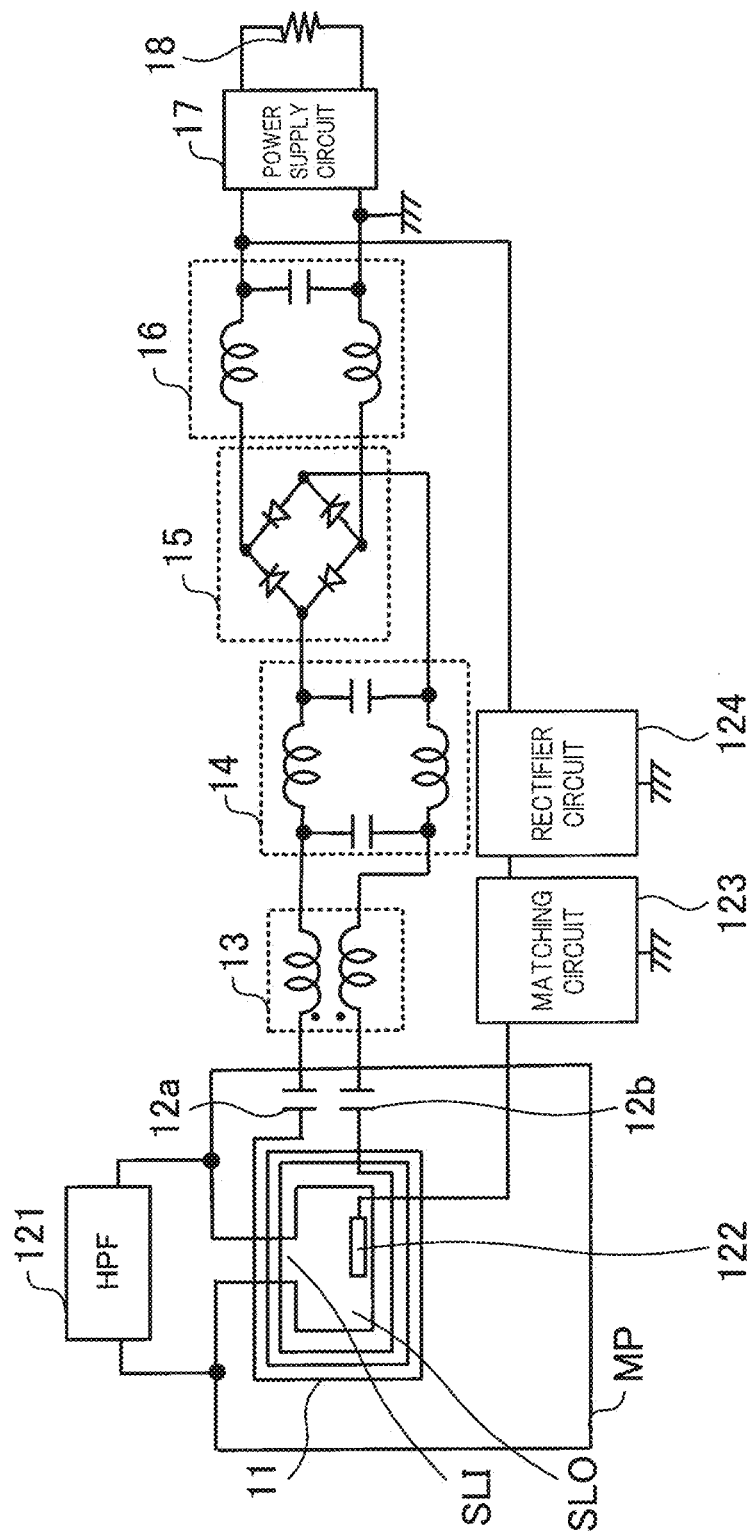
FIG. 21 is a diagram showing a power transmission device according to a ninth embodiment.

FIG. 21 is a diagram showing a power transmission device according to the ninth embodiment. For example, the power transmission device shown in FIG. 21 is incorporated in the mobile device 1 shown in FIG. 2 and receives power transmitted from the charger 2. In FIG. 21, the same characters as those in FIG. 3 are assigned to the same components as those in FIG. 3.

As shown in FIG. 21, the power transmission device includes a high pass filter (HPF) 121, a feed element 122, a matching circuit 123 and a rectifier circuit 124. For example, the power transmission device receives power in MHz band by the coil 11. Also, the power transmission device receives power in GHz band by the feed element 122. Namely, the power transmission device can receive powers transmitted by different systems.

For example, the HPF 121 has high impedance when receiving power in MHz band and has low impedance when receiving power of microwave in GHz band.

Namely, the metal plate MP becomes a metal plate having the slit SLI when receiving power in MHz band. Accordingly, the power transmission device can output the power received by the coil 11 to the load 18 through the balun trans 13, the LPF 14, the rectifier circuit 15, the smoothing circuit 16 and the power supply circuit 17.

On the other hand, the slit SLI of the metal plate MP is short-circuited by the HPF 121 when receiving power in GHz band. Therefore, the metal plate MP becomes a slot antenna having the closed slit SLI. Accordingly, the power transmission device can output the power of microwave received by the feed element 122 to the load 18 through the matching circuit 123, the rectifier circuit 124 and the power supply circuit 17.

The feed element 122 receives power of microwave. The feed element 122 is provided on an inner side of the slop SLO (in a region of the slot SLO).

The matching circuit 123 matches the feed element 122 and the rectifier circuit 124. The rectifier circuit 124 rectifies the power of microwave received by the feed element 122. The power of microwave rectified by the rectifier circuit 124 is output to the power supply circuit 17.

As described above, the power transmission device includes the feed element 122 provided on an inner side of the slot SLO and the HPF 121 connected across the slit SLI of the metal plate MP. Accordingly, the power transmission device can receive the powers of different power transmission frequencies.

Tenth Embodiment

In a tenth embodiment, it is possible to charge a plurality of mobile devices 1.

Figure 22:
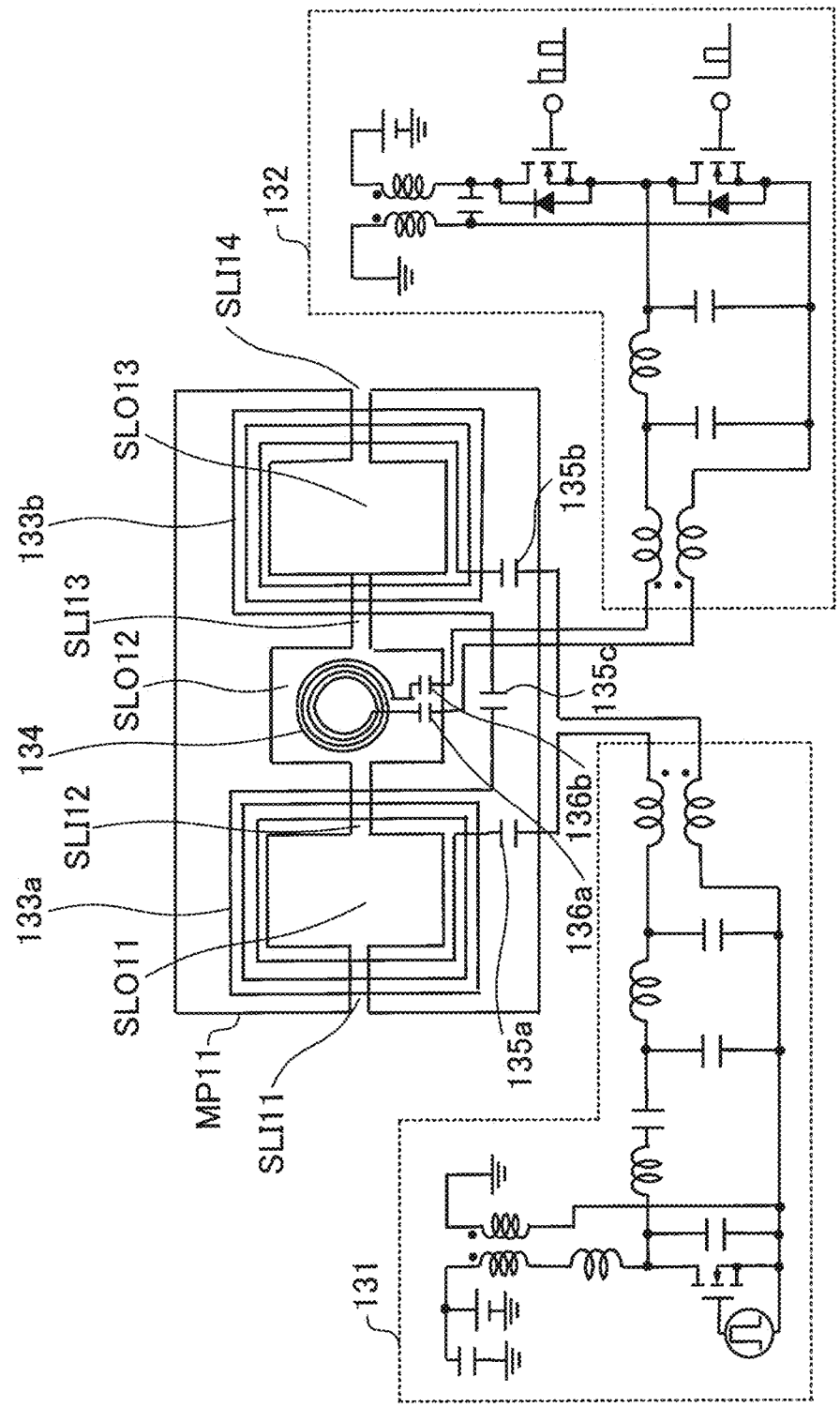
FIG. 22 is a diagram showing a power transmission device according to a tenth embodiment.

FIG. 22 is a diagram showing a power transmission device according to the tenth embodiment. As shown in FIG. 22, the power transmission device includes power transfer circuits 131 and 132 and coils 133a, 133b and 134. In addition, FIG. 22 shows a metal plate MP11 provided in the charger 2. The power transmission device shown in FIG. 22 is incorporated in the charger 2 shown in FIG. 2 and transmits power to the mobile device 1.

The metal plate MP11 has slots SLO11 and SLO13 and a slot SLO12 provided between the slots SLO11 and SLO13. The slot SLO11 has a slit SLI11 and a slit SLI12 connected to the slot SLO12. The slot SLO13 has a slit SLI14 and a slit SLI13 connected to the slot SLO12.

For example, the power transfer circuit 131 is the same as the power transfer circuit shown in FIG. 16 and transmits power from several MHz to several tens MHz. For example, the power transfer circuit 132 is the same as the power transfer circuit shown in FIG. 17 and transmits power of several hundred KHz.

The coils 133a and 133b are connected in series via a capacitor 135c. One end of the coil 133a to which the capacitor 135c is not connected is connected to a capacitor 135a. One end of the coil 133b to which the capacitor 135c is not connected is connected to a capacitor 135b.

One end of the capacitor 135a which is not connected to one end of the coil 133a is connected to a balun trans of the power transfer circuit 131. One end of the capacitor 135b which is not connected to one end of the coil 133b is connected to the balun trans of the power transfer circuit 131. The coils 133a and 133b and the capacitors 135a, 135b and 135c are formed so as to be symmetrical in terms of circuit when viewed from the balun trans of the power transfer circuit 131.

The coil 133a is formed so that its inner peripheral portion is located on an outer side than the slot SLO11 of the metal plate MP11. The coil 133b is formed so that its inner peripheral portion is located on an outer side than the slot SLO13 of the metal plate MP11.

When the power transfer circuit 131 outputs power to the coils 133a and 133b, magnetic flux is generated from the two coils 133a and 133b. Therefore, the mobile device 1 is charged by being placed above either one of the coils 133a and 133b. Also, the two mobile devices 1 are simultaneously charged by being placed above the coils 133a and 133b, respectively. Namely, the power transmission device shown in FIG. 22 can charge the two mobile devices 1 simultaneously.

The coil 134 corresponds to the coil 85 shown in FIG. 17 though they are different in shape. The capacitors 136a and 136b correspond to the capacitors 84a and 84b shown in FIG. 17. The coil 134 is formed so that its outer peripheral portion is located on an inner side than the slot SLO12 of the metal plate MP11.

When the power transfer circuit 131 outputs power to the coil 134, magnetic flux is generated from the coil 134. Therefore, the mobile device 1 is charged with power of the system different from those of the coils 133a and 133b by being placed above the coil 134. Also, when one mobile device 1 is placed above the coil 134 and the other mobile device 1 is placed above one of the coils 133a and 133b, the two mobile devices 1 are charged simultaneously by the different power transmission systems. In addition, three mobile devices 1 can be charged simultaneously by being placed above the coils 133a, 133b and 134, respectively.

Note that the power transmission device does not have to include the power transfer circuit 132, the coil 134 and the capacitors 136a and 136b. In this case, the slot SLO12 of the metal plate MP11 is also unnecessary. Even in such a case, the power transmission device can charge the two mobile devices 1 simultaneously by placing the two mobile devices 1 above the coils 133a and 133b.

As described above, the metal plate MP11 has the slot SLO11 and the slot SLO13 connected to the slot SLO11.

Also, the slot SLO11 of the metal plate MP11 has the slit SLI11 and the slot SLO13 has the slit SLI14. The power transmission device includes the coil 133a formed so that its inner peripheral portion is located on an outer side than the slot SLO11 and the coil 133b connected to the coil 133a and formed so that its inner peripheral portion is located on an outer side than the slot SLO13. The power transmission device further includes the capacitor 135a connected to one end of the coil 133a which is not connected to the coil 133b and the capacitor 135b connected to one end of the coil 133b which is not connected to the coil 133a. Accordingly, the power transmission device can suppress the magnetic field leakage and can charge the plurality of mobile devices 1.

Also, the metal plate MP11 has the slot SLO12 between the slot SLO11 and the slot SLO13. The power transmission device includes the coil 134, which is different in power transmission system from the coils 133a and 133b, in the slot SLO12. Accordingly, the power transmission device can suppress the magnetic field leakage and can charge the plurality of mobile devices 1 of different power transmission systems.

Eleventh Embodiment

An example in which a power transmission device is applied to the charging of a vehicle will be described in an eleventh embodiment.

Figure 23:
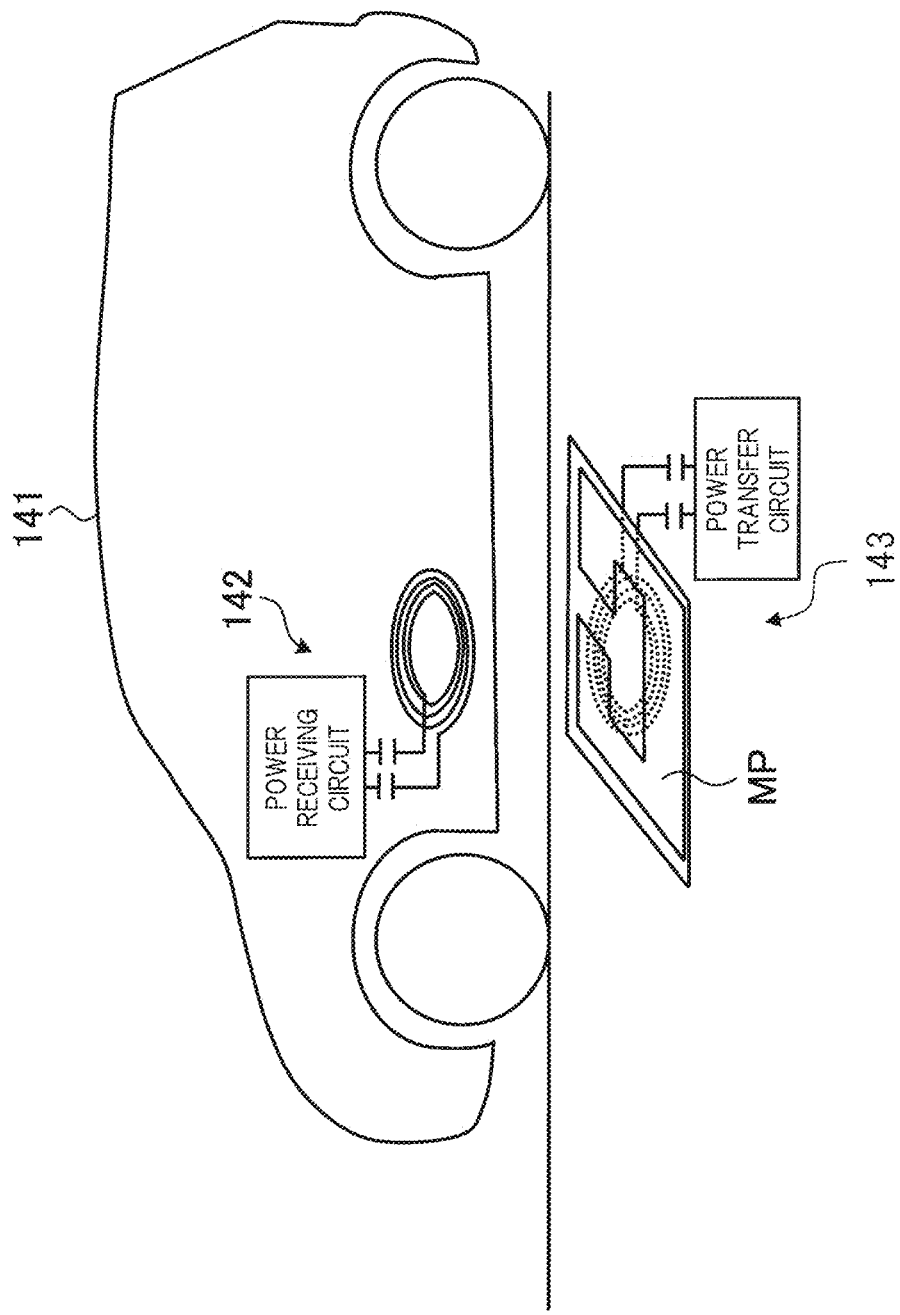
FIG. 23 is a diagram showing an applied example of a power transmission device according to an eleventh embodiment.

FIG. 23 is a diagram showing an applied example of a power transmission device according to the eleventh embodiment. FIG. 23 shows a vehicle 141, a power transmission device 142 on a power receiving side, a power transmission device 143 on a power transfer side and the metal plate MP.

The vehicle 141 includes the power transmission device 142 that receives power. The power transmission device 142 corresponds to the power transmission device on a power receiving side described in the embodiments above.

The power transmission device 142 receives power through a metal chassis of the vehicle 141. The vehicle 141 charges the received power in a battery (not shown).

The power transmission device 143 (charger) which transmits power is buried in the ground. The power transmission device 143 corresponds to the power transmission device on a power transfer side described in the embodiments above.

The vehicle 141 passes over the power transmission device 143 at the time of charging. Therefore, the metal plate MP for protecting the coil is also buried in the ground above the coil of the power transmission device 143.

As described above, the power transmission device can suppress the magnetic field leakage even in the charging of the vehicle via the metal plate.

Note that the power transmission device is applicable to other wireless power transfer systems. For example, the power transmission device is applicable to a wireless power transfer system via a metal plate such as a power lift used for nursing care.

In the foregoing, the present invention has been described by use of embodiments, and these embodiments are those obtained by classifying the present invention in accordance with the main processing contents in order to make the configuration of the power transmission device easier to understand. The present invention is not limited by the manner of classification and the name of the constituent elements. It is also possible to classify the configuration of the power transmission device into more constituent elements in accordance with the processing contents. In addition, one constituent element can be classified to execute more processes. Further, the process of each constituent element may be executed by one hardware or may be executed by a plurality of hardware.

Also, the technical scope of the present invention is not limited by the descriptions of the embodiments above. It is apparent for the person having ordinary skill in the art that various modifications and improvements can be applied to the embodiments above. In addition, it is apparent from the descriptions of claims that the embodiments to which such modifications and improvements are applied are also included in the technical scope of the present invention. Further, it is also possible to combine the respective embodiments.

Also, the position, size, shape and range of each configuration shown in the drawings and others do not represent the actual position, size, shape and range in some cases for easier understanding of the invention. Therefore, the present invention is not always limited to the position, size, shape and range disclosed in the drawings and others.

REFERENCE SIGNS LIST

1: mobile device, 2: charger, 1a: coil, 1ba, 1bb: capacitor, 1c: power receiving circuit, 1d: battery, 2a: coil, 2ba, 2bb: capacitor, 2c: power transfer circuit, MP: metal plate, SLO: slot, SLI: slit, 11: coil, 12a, 12b: capacitor, 13: balun trans, 14: LPF, 15: rectifier circuit, 16: smoothing circuit, 17: power supply circuit, 18: load, 21: magnetic sheet, 22: power receiving circuit, 23: main body, 24: display, 41: coil, 42: capacitor, 51: LPF, 52: forced balun trans, 61, 62: coil, 63: capacitor, 71, 72: magnetic sheet, 81: E class amplifier, 82: LPF, 83: balun trans, 84a, 84b: capacitor, 85: coil, 86: common mode filter, 87: power supply, 91: power transfer amplifier, 101: LPF, 102, 103: coil, 104: capacitor, 111, 112: magnetic sheet, 113: power transfer circuit, 114: main body, MP1: metal plate, SLO1, SLO2: slot, SLI1, SLI2: slit, SW: switch, 121: HPF, 122: feed element, 123: matching circuit, 124: rectifier circuit, 131, 132: power transfer circuit, 133a, 133b, 134: coil, 135a-135c, 136a, 136b: capacitor, MP11: metal plate, SLO11-SLO13: slot, SLI11-SLI14: slit, 141: vehicle, 142: power transmission device, 143: power transmission device

The invention claimed is:

1. A power transmission device comprising:
   a coil which is provided so as to face a conductor plate having an aperture and a slit connected to the aperture and is formed so that its inner peripheral portion is located on an outer side than the aperture;
   a first capacitive element connected to one end of the coil; and
   a second capacitive element connected to the other end of the coil,
   wherein the aperture includes a first aperture and a second aperture connected to the first aperture, wherein the slit is provided in the second aperture,
   wherein the coil is formed so that its inner peripheral portion is located on an outer side than the first aperture, and
   wherein a switch for short-circuiting the slit is provided on the slit.

2. The power transmission device according to claim 1, the power transmission device is symmetrical in terms of circuit when viewed from a terminal of the first capacitive element which is not connected to the one end of the coil and a terminal of the second capacitive element which is not connected to the other end of the coil.

3. The power transmission device according to claim 1 further comprising:
a capacitive element connected at an intermediate point between the one end and the other end of the coil.

4. The power transmission device according to claim 1, wherein a balun transformer is connected to a terminal of the first capacitive element which is not connected to the one end of the coil and a terminal of the second capacitive element which is not connected to the other end of the coil.

5. The power transmission device according to claim 1 further comprising:
a feed element provided on an inner side of the aperture; and
a high pass filter connected across the slit.

6. A power transmission device comprising:
a coil which is provided so as to face a conductor plate having an aperture and a slit connected to the aperture and is formed so that its inner peripheral portion is located on an outer side than the aperture;
a first capacitive element connected to one end of the coil; and
a second capacitive element connected to the other end of the coil,
wherein the aperture includes a first aperture and a second aperture connected to the first aperture,
wherein the slit is provided in the first aperture and the second aperture,
wherein the coil includes a first coil formed so that its inner peripheral portion is located on an outer side than the first aperture and a second coil connected to the first coil in series and formed so that its inner peripheral portion is located on an outer side than the second aperture,
wherein the first capacitive element is connected to one end of the first coil which is not connected to the second coil, and
wherein the second capacitive element is connected to one end of the second coil which is not connected to the first coil.

7. The power transmission device according to claim 6,
wherein the aperture includes a third aperture between the first aperture and the second aperture, and
wherein a third coil different in power transmission system from the first coil and the second coil is disposed in the third aperture.

* * * * *